(12) United States Patent
Zediker

(10) Patent No.: US 10,562,132 B2
(45) Date of Patent: Feb. 18, 2020

(54) APPLICATIONS, METHODS AND SYSTEMS FOR MATERIALS PROCESSING WITH VISIBLE RAMAN LASER

(71) Applicant: Mark S. Zediker, Castle Rock, CO (US)

(72) Inventor: Mark S. Zediker, Castle Rock, CO (US)

(73) Assignee: Nuburu, Inc., Centennial, CO (US)

( * ) Notice: Subject to any disclaimer, the term of this patent is extended or adjusted under 35 U.S.C. 154(b) by 1075 days.

(21) Appl. No.: 14/837,782

(22) Filed: Aug. 27, 2015

(65) Prior Publication Data

US 2016/0067827 A1 Mar. 10, 2016

Related U.S. Application Data

(63) Continuation-in-part of application No. PCT/US2014/035928, filed on Apr. 29, 2014.

(60) Provisional application No. 62/042,785, filed on Aug. 27, 2014, provisional application No. 62/193,047, filed on Jul. 15, 2015, provisional application No. 61/817,311, filed on Apr. 29, 2013.

(51) Int. Cl.
*B23K 26/342* (2014.01)
*H01S 3/094* (2006.01)
*B23K 26/04* (2014.01)
*B23K 26/0622* (2014.01)
*B33Y 10/00* (2015.01)
*B33Y 30/00* (2015.01)

(52) U.S. Cl.
CPC ............ *B23K 26/342* (2015.10); *B23K 26/04* (2013.01); *B23K 26/0622* (2015.10); *B33Y 10/00* (2014.12); *B33Y 30/00* (2014.12); *H01S 3/094046* (2013.01)

(58) Field of Classification Search
CPC ............ H01S 3/094046; B23K 26/342; B23K 26/0622
See application file for complete search history.

(56) References Cited

U.S. PATENT DOCUMENTS 4,288,678 A 9/1981 LaRocca
4,679,198 A 7/1987 Shone
(Continued)

FOREIGN PATENT DOCUMENTS

CN 1386608 A 12/2002
CN 104742376 7/2015
(Continued)

OTHER PUBLICATIONS

Namiki et al., "Ultrabroad-Band Raman Amplifiers Pumped and Gain-Equalized by Wavelength-Division-Multiplexed High-Power Laster Diodes",2001, IEEE Journal on Selected Topics in Quantum Electronics, vol. 7, No. 1, Jan./Feb. 2001, pp. 3-16. (Year: 2001).*
(Continued)

*Primary Examiner* — Geoffrey S Evans
(74) *Attorney, Agent, or Firm* — Glen P. Belvis; Belvis Law, LLC.

(57) ABSTRACT

Laser additive manufacturing systems and apparatus using laser wavelengths below 800 nm. Raman laser modules having laser pump sources in the blue wavelength range. Matching functional laser beam wavelength with maximum absorption wavelengths of starting materials.

44 Claims, 17 Drawing Sheets

(56) References Cited

U.S. PATENT DOCUMENTS

| | | |
|---|---|---|
| 4,847,479 A | 7/1989 | Clark |
| 4,879,449 A | 11/1989 | Duley |
| 4,930,855 A | 6/1990 | Clark |
| 4,973,819 A * | 11/1990 | Thatcher ............... B23K 26/10 |
| | | 219/121.63 |
| 5,379,310 A | 1/1995 | Papen |
| 5,392,308 A | 2/1995 | Welch |
| 5,393,482 A | 2/1995 | Benda |
| 5,502,292 A | 3/1996 | Pernicka |
| 5,526,155 A | 6/1996 | Knox |
| 5,578,227 A | 11/1996 | Rabinovich |
| 5,808,803 A | 9/1998 | Uliman |
| 5,903,583 A | 5/1999 | Uliman |
| 5,923,475 A | 7/1999 | Kurtz |
| 5,986,794 A | 11/1999 | Krause |
| 5,987,043 A | 11/1999 | Brown |
| 6,085,122 A | 7/2000 | Manning |
| 6,124,973 A | 9/2000 | Du |
| 6,129,884 A | 10/2000 | Beers |
| 6,151,168 A | 11/2000 | Goering |
| 6,175,452 B1 | 1/2001 | Uilmann |
| 6,191,383 B1 | 2/2001 | Jense |
| 6,212,310 B1 | 4/2001 | Waarts |
| 6,251,328 B1 | 6/2001 | Beyer |
| 6,331,692 B1 | 10/2001 | Krausse |
| 6,327,292 B1 | 12/2001 | Sanchez-Fubio |
| 6,575,863 B2 | 6/2003 | Piltch |
| 6,584,133 B1 | 6/2003 | Walker |
| 6,591,040 B1 | 7/2003 | Dempewolf |
| 6,940,037 B1 | 9/2005 | Kovacevic |
| 9,203,209 B2 | 12/2005 | Ramachandran |
| 7,001,467 B2 | 2/2006 | Pique |
| 7,006,549 B2 | 2/2006 | Anikitchev |
| 7,034,992 B2 | 4/2006 | Komine |
| 7,233,442 B1 | 6/2007 | Brown |
| 7,765,022 B2 | 7/2010 | Mazumder |
| 7,959,353 B2 | 6/2011 | Anantharaman |
| 8,130,807 B2 | 3/2012 | Schulz-Harder |
| 8,488,245 B1 | 7/2013 | Chann |
| 8,520,311 B2 | 8/2013 | Krause |
| 8,553,327 B2 | 10/2013 | Chann |
| 8,559,107 B2 | 10/2013 | Chann |
| 8,670,180 B2 | 3/2014 | Chann |
| 8,724,222 B2 | 5/2014 | Chann |
| 9,093,822 B1 | 7/2015 | Chann |
| 9,172,208 B1 | 10/2015 | Dawson |
| 9,104,029 B2 | 11/2015 | Tayebati |
| 9,178,333 B2 | 11/2015 | Tayebati |
| 9,190,807 B2 | 11/2015 | Tayebati |
| 9,256,073 B2 | 2/2016 | Chann |
| 9,268,097 B2 | 2/2016 | Huang |
| 9,268,142 B2 | 2/2016 | Chann |
| 9,310,560 B2 | 4/2016 | Chann |
| 2002/0149137 A | 10/1992 | Jang |
| 2001/0023921 A1 | 9/2001 | Mano |
| 2003/0052105 A1 * | 3/2003 | Nagano ............... B23K 26/0604 |
| | | 219/121.83 |
| 2003/0063631 A1 | 4/2003 | Corcoran |
| 2003/0142393 A1 * | 7/2003 | Kuksenkov ......... H01S 3/06791 |
| | | 359/341.1 |
| 2004/0094527 A1 | 5/2004 | Bourne |
| 2004/0173587 A1 | 9/2004 | Musselman |
| 2004/0036242 A1 | 12/2004 | Orozco |
| 2004/0254474 A1 | 12/2004 | Seibel |
| 2005/0103760 A1 | 5/2005 | Kaplan |
| 2005/0173385 A1 | 8/2005 | Smart |
| 2006/0160332 A1 | 7/2006 | Gu |
| 2008/0085368 A1 * | 4/2008 | Gauthier ................ C23C 14/28 |
| | | 427/314 |
| 2008/0286139 A1 * | 11/2008 | Abe ..................... B22F 3/1055 |
| | | 419/7 |
| 2009/0051935 A1 | 2/2009 | Cooper |
| 2009/0081272 A1 * | 3/2009 | Clarke ............... A61L 31/022 |
| | | 424/423 |
| 2009/0190218 A1 | 7/2009 | Govorkov |
| 2010/0290106 A1 | 11/2010 | Digiovanni |
| 2011/0122482 A1 | 5/2011 | Mead |
| 2011/0129615 A1 | 6/2011 | Renn |
| 2011/0216792 A1 | 9/2011 | Chann |
| 2011/0259862 A1 | 10/2011 | Scott |
| 2011/0267671 A1 | 11/2011 | Peng |
| 2011/0293771 A1 * | 12/2011 | Oberhofer ............ B22F 3/1055 |
| | | 425/182 |
| 2011/0311389 A1 | 12/2011 | Ryan |
| 2012/0012570 A1 | 1/2012 | Briand |
| 2012/0020631 A1 | 1/2012 | Rinzler |
| 2012/0285936 A1 | 11/2012 | Urashima |
| 2013/0071738 A1 | 3/2013 | Wang |
| 2013/0148673 A1 | 6/2013 | Creeden |
| 2013/0162952 A1 | 6/2013 | Lippey et al. |
| 2013/0269748 A1 | 10/2013 | Wiedeman et al. |
| 2014/0023098 A1 | 1/2014 | Clarkson |
| 2014/0086539 A1 | 3/2014 | Sorraa |
| 2014/0112357 A1 | 4/2014 | Abedin |
| 2014/0249495 A1 | 9/2014 | Mumby et al. |
| 2014/0252687 A1 | 9/2014 | El-Dasher |
| 2015/0033343 A1 | 1/2015 | Jiang |
| 2015/0151491 A1 * | 6/2015 | Teulet .................. B22F 3/1055 |
| | | 700/120 |
| 2015/0165556 A1 | 6/2015 | Gordon |
| 2015/0333473 A1 | 11/2015 | Gapontsev |
| 2016/0067780 A1 | 3/2016 | Nuburu |
| 2016/0067827 A1 | 3/2016 | Nuburu |
| 2016/0322777 A1 | 11/2016 | Nuburu |
| 2017/0021454 A1 | 1/2017 | Joseph |
| 2017/0021455 A1 | 1/2017 | Joseph |
| 2017/0341144 A1 | 11/2017 | Nuburu |
| 2017/0341180 A1 | 11/2017 | Nuburu |
| 2017/0343729 A1 | 11/2017 | Nuburu |
| 2018/0236605 A1 | 8/2018 | Finuf et al. |
| 2018/0375296 A1 | 12/2018 | Nuburu |
| 2019/0025502 A1 | 1/2019 | Nuburu |
| 2019/0089983 A1 | 5/2019 | Nuburu |

FOREIGN PATENT DOCUMENTS

| | | |
|---|---|---|
| CN | 104742377 | 7/2015 |
| DE | 102013011676 | 1/2013 |
| EP | 1437882 | 7/2004 |
| EP | 3307525 | 4/2018 |
| EP | 3307526 | 4/2018 |
| JP | 6225263 | 6/2015 |
| RU | 2132761 C1 | 7/1999 |
| RU | 2141881 C1 | 11/1999 |
| RU | 2205733 C2 | 6/2003 |
| WO | WO 2015134075 | 9/2014 |
| WO | 2014179345 A1 | 11/2014 |
| WO | WO 2014/179345 | 11/2014 |
| WO | WO 2016201309 | 12/2016 |
| WO | WO 2016201326 | 12/2016 |

OTHER PUBLICATIONS

PCT, Search Report Report PCT/US2017/030175, dated Jul. 13, 2017.
International Search Report of the International Searching Authority, PCT/US2014/035928, dated Aug. 26, 2014.
Written Opinion of the International Searching Authority, PCT/US2014/035928, dated Aug. 26, 2014.
International Preliminary Report on Patentability, PCT/US2014/035928, dated Nov. 3, 2015.
International Search Report of the International Searching Authority, PCT/US2015/047226 dated Jan. 7, 2016.
Written Opinion of the International Searching Authority, PCT/US2015/047226, dated Jan. 7, 2016.
Communication Pursuant to Rules 70(2) and 70a(2) EPC, EP14791734.8, dated Oct. 14, 2016.
Translation of the Official Action, RU015151016/02, dated Mar. 20, 2017.
Translation of the Search Report, RU015151016/02 (078493), Search Completed Mar. 4, 2017.

(56) References Cited

OTHER PUBLICATIONS

Extended European Search Report, EP14791734.8, dated Sep. 27, 2016.
Machine Language Translation, 1386608ACN, Dec. 25, 2002.
International Search Report, PCT/US16/42363, dated Dec. 8, 2016.
Written Opinion of the International Searching Authority, PCT/US16/42363, dated Dec. 8, 2016.
Machine Translation, JP2003-340924, Dec. 2, 2003.
Machine Translation, JP2003-206323, Jul. 22, 2003.
Translation of the Abstract, RU2132761C1, Jul. 10, 1999.
Translation of the Abstract, RU2205733C2, Jun. 10, 2003.
U.S. Appl. No. 15/581,928, Pelaprat, filed Apr. 28, 2017.
U.S. Appl. No. 15/581,494, Zediker, filed Apr. 28, 2017.
U.S. Appl. No. 15/581,263, Zediker, filed Apr. 28, 2017.
U.S. Appl. No. 16/403,512, filed May 4, 2019, Nuburu.
Aug. 18, 2017, Johannes Trapp, In situ absorptivity measurements of metallic powders during laser powder-bed fusion additive manufacturing.
Dec. 1, 2006, GSI, CRS Series—Resonant Optical Scanners.
Nov. 2012, Concept Laser, X line 100R—Metal laser Melting System.
Sep. 21, 2017, 3D Print.com, Nuburu blue laser system.
Nov. 13, 2014, Fraunhofer ILT, Selective Laser Melting Press Relealse.
Aug. 2005, Larry Johnson, Laser Diode Burn-In and Reliability Testing.
Nov. 17, 2012, Nobuyasu Suzuki, 10 W CW blue-violet diode laser array on the micro-channel cooler.
Mar. 15, 1996, Helms, Life tests on Nichia AlGaN/InGaN/GaN blue-light-emitting diodes (Sandia National Laboratories).
Sep. 3, 1997, Melanie Ott, Capabilities and Reliability of LEDs and Laser Diodes.
Jan. 2000, Shuji Nakamura, Current Status and Future prospects of InGaN-Based Laser Diodes.
Jan. 2012, IPG Photogenics, YLM Fiber Laser—Single Mode Series.
May/Jun. 2007, Thomas H. Loftus, Spectrally Beam-Combined Fiber Lasers for High-Average-Power Applications.
Jun. 24, 2010, John E. Heebner, High Brightness, quantum-defect-limited conversion efficiency in cladding-pumped Raman fiber amplifiers and oscilators.
Feb. 2007, Christophe Andre Codemard, High-Power Cladding-Pumped Raman and Erbium-Ytterbium Doped Fibre Solutions.
Aug. 2011, Ondrej Kitzler, CW Diamond laser architecture for high average power raman beam conversion.
Oct. 1, 2014, N. V. Surovtsev, Temperature Dependence of the Raman line width in diamond: Revisited.
Nov. 20, 2015, Tianfu Yao, High-power Continuous-Wave Directly-Diode-Pumped Fiber Raman Lasers.
Jun. 1, 2008, Arman B. Fallahkhair, Vectore Finite Difference Modesolver for Anisoptropic Dielectric Waveguides.
Jan. 2011, Jean-philippe Feve, High average power diamond Raman laser.
Jan. 2016, Ekaterina A. Zlobina, Singlemode Raman Lasing in Graded-Index Fiber Pumped by High-Power 915-nm Laser Diode.
Jun. 2016, Yaakov Glick, High power, high efficiency diode pumped Raman fiber laser.
Nov. 2015, Yao, High-Power Continuous-Wave Directly-Diode-Pumped Fiber Raman Lasers.
Nov. 11, 1992, Katsusuke Tajima, Low Rayleigh Scattering P2 O5-F-Si O2 Glasses.
Aug. 1, 1976, K. O. Hill, Low-threshold cw Raman laser.
Jan. 2017, Ekaterina A. Zlobina, graded-index fiber directly pumped by a multimode laser diode.
Nov. 18, 2003, Shenghong Huang, Generation of 10.5 W 1178 nm Laser Based on Phosphosilicate Raman Fiber Laser.
Aug. 10, 2015, Hongxin Su, Investegation of Stimulated Raman Scattering in a Phosphorus-doped silica fiber.
Jun. 1997, I. K. Ilev, Ultraviolet and blue discretely tunable double-pass fiber Raman laser.
Nov. 7, 2004, V. A. Lisinetskii, Raman Gain Coefficient of Barium Nitrate Measured for the Spectral Region of TI: Sapphire Laser.
Dec. 2003, Nathan R. Newbury, Pump-Wavelength Dependence of Raman Gain in Single-Mode Optical Fibers.
Jan. 1, 2014, CPT, Reduced Mode Sapphire Optical Fiber and Sensing System.
Jul. 15, 2002, N. R. Newbury, Rman gain: pump-wavelength dependence in single-mode fiber.
Jan. 2016, Ekaterina A. Zlobina, Raman Lasing in GRIN Fibers with 915-nm Diode Pumping.
May/Jun. 2002, Mohammed N. Islam, Raman Amplifiers for Telecommunications.
Aug. 2005, A. Mart'inez Rios, Analytical approach for the design of cascaded raman fiber lasers.
Nov. 11, 2000, Kyozo Tsujikawa, Rayleigh Scattering Reduction Method for Silica-Based Optical Fiber.
Aug. 20, 1997, Rick K. Nubling, Optical properties of single-crystal sapphire fibers.
Jan. 2015, David J Spence, Spatial and Spectral Effects in Continuous Wave Intracavity Raman Lasers.
Apr. 2014, Bonner, Spectral broadening in Continuous-wave intracavity Raman lasers.
May 30, 2013, A. A. Lanin, The phase-controlled Raman effect.
May 15, 2005, V. G. Plotnichenko, Raman band intensities of tellurite glasses.
Nov. 23, 2000, P.A. Champert, Tunable, broad visible Range, fibre-based Raman Source.
Apr. 2012, Christian Agger, Supercontinuum generation in ZBLAN fibers—detailed comparison between measuremnt and simulation.
Aug. 1977, W. J. Tomlinson, Wavelength multiplexing in multimode optical fibers.
Feb. 15, 2007, Robin K. Huang, High-Brightness Wavelength Beam Combined Semiconductor Laser Diode Arrays.
May/Jun. 2005, T. Y. Fan, Laser Beam Combining for High-Power, High-Radiance Sources.
May 2002, Erik J. Bochove, Theory of Spectral Beam Combining of Fiber Lasers.
Mar./Apr. 2009, Oleksiy Andrusyak, Spectral Combining and Coherent coupling of Lasers by Volume Bragg Gratings.
Apr. 2005, Dennis Lowenthal, Across the Spectrum: Combining laser emitters yields a high-power source with a useful beam.
Jun. 18, 2003, Steven C. Tidwell, Spectral beam combining of diode laser bars achieve effiecient near diffraction limited output power (Abstract only).
Nov. 23, 2014, Jeff Hecht, Photonic Frontiers: beam combining.
Jun. 1, 2004, Charles E. Hamilton, High-power laser source with Spectrally beam-combined diode laser bars (abstract only).
Apr. 20, 1987, Chandrasekhar Roychoudhuri, Laser Beam Combining Technology (abstract only).

* cited by examiner

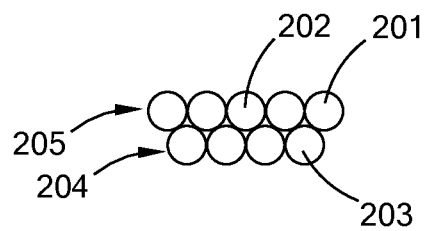
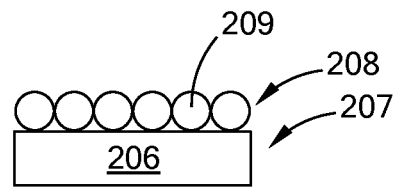
FIG. 2  FIG. 2B
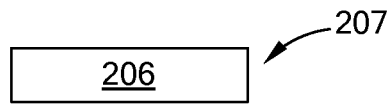
FIG. 2A
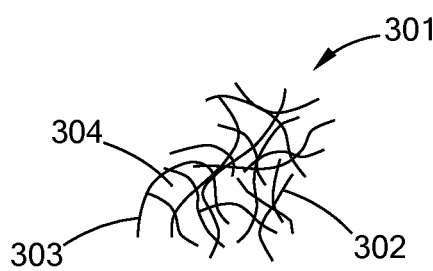
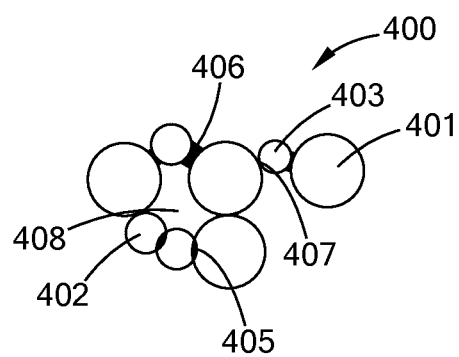
FIG. 3  FIG. 4

Raman Cascade for Several Materials Starting with 450 nm Input

| Raman Frequency Shifts | Silica | GeO2 | Phosphorus | Diamond | KGW | YVO4 | Ba(NO3)2 |
|---|---|---|---|---|---|---|---|
| Delta Lambda (cm-1) | 440 | 440 | 1330 | 1332 | 901 | 892 | 1047 |
| 1st Stokes | 459 | 459 | 479 | 479 | 469 | 469 | 472 |
| 2nd Stokes | 469 | 469 | 511 | 511 | 490 | 489 | 497 |
| 3rd Stokes | 478 | 478 | 548 | 549 | 512 | 512 | 524 |
| 4th Stokes | 489 | 489 | 592 | 592 | 537 | 536 | 555 |
| 5th Stokes | 499 | 499 | 642 | 643 | 564 | 563 | 589 |
| 6th Stokes | 511 | 511 | 702 | 703 | 595 | 593 | 627 |
| 7th Stokes | 522 | 522 | 774 | 775 | 628 | 626 | 671 |
| 8th Stokes | 535 | 535 | 863 | 865 | 666 | 663 | 722 |
| 9th Stokes | 548 | 548 | 975 | 977 | 709 | 705 | 781 |

FIG. 13C

Raman Cascade for Several Materials Starting with 450 nm Input

| Raman Frequency Shifts | Silica | GeO2 | Phosphorus | Diamond | KGW | YVO4 | Ba(NO3)2 |
|---|---|---|---|---|---|---|---|
| Delta Lambda (cm-1) | 440 | 440 | 1330 | 1332 | 901 | 892 | 1047 |
| 1st Stokes | 441 | 441 | 425 | 425 | 432 | 433 | 430 |
| 2nd Stokes | 433 | 433 | 402 | 402 | 416 | 417 | 411 |
| 3rd Stokes | 425 | 425 | 382 | 381 | 401 | 402 | 394 |
| 4th Stokes | 417 | 417 | 363 | 363 | 387 | 388 | 379 |
| 5th Stokes | 409 | 409 | 346 | 346 | 374 | 375 | 364 |
| 6th Stokes | 402 | 402 | 331 | 331 | 362 | 363 | 351 |
| 7th Stokes | 395 | 395 | 317 | 317 | 351 | 351 | 338 |
| 8th Stokes | 388 | 388 | 304 | 304 | 340 | 341 | 327 |
| 9th Stokes | 382 | 382 | 292 | 292 | 330 | 331 | 316 |

FIG. 14C

APPLICATIONS, METHODS AND SYSTEMS FOR MATERIALS PROCESSING WITH VISIBLE RAMAN LASER

This application: (i) claims under 35 U.S.C. § 119(e)(1), the benefit of the filing date of Aug. 27, 2014 of U.S. provisional application Ser. No. 62/042,785; (ii) claims under 35 U.S.C. § 119(e)(1), the benefit of the filing date of Jul. 15, 2015 of U.S. provisional application Ser. No. 62/193,047; and, (iii) is a continuation-in-part of PCT application serial PCT/US14/035928, which claims under 35 U.S.C. § 119(e)(1), the benefit of the filing date of Apr. 29, 2013 of US provisional application 61/817,311, the entire disclosures of each of which are incorporated herein by reference.

BACKGROUND OF THE INVENTION

Field of the Invention

The present inventions relate to lasers that produce laser beams in the 300 nm to 700 nm range, including higher power laser beams in these wavelengths having excellent beam qualities. The present inventions further relate to laser manufacturing processes, systems and devices, and in particular to laser additive manufacturing processes using the novel laser beams of the novel lasers of the present inventions.

Prior to the present inventions, laser beams in the 300-700 nm range are typically obtained from a laser source using frequency doubling of a near infrared or infrared laser. To date is it believed that, in general and in particular for commercially viable systems, the art has been unable to scale these types of lasers to make higher power lasers, e.g., laser greater than 500 W (0.5 kW), and in particular 1 kW and greater. Thus, to date it is believed that the art has been unable to scale these lasers to obtain high power lasers having high beam quality, in the 300-700 nm wavelength range. This inability to obtain high power lasers in these wavelengths is generally believed in the art to be limited by the nonlinear crystal's ability to handle the heat load and fluence levels required at high power levels, among other things. As a consequence, the highest power, high beam quality laser available by frequency doubling is presently believed to be limited to about 400 Watts (0.4 kW) pulsed. The pulsing is required to manage the heat load on the crystal. It is believed that commercially viable or useful lasers in the 300-700 nm range having higher powers, e.g., 1 kW and greater, and having high beam quality, e.g., $M^2\sim1$, have not been obtained, prior to the present inventions.

Prior to embodiments of the present inventions, it is believed that there were generally four types of blue lasers. Blue lasers are those that have wavelengths in the range of about 400-505 nm, and typically 405-495 nm. These blue lasers are: (i) He:Cd, (ii) Ar-ion, (iii) diode laser direct and frequency doubled, (iv) solid state parametric oscillator and frequency doubled and (v) fiber lasers doubled and frequency shifted fiber lasers doubled.

(i) He:Cd lasers are single mode but limited in power to a few hundred milli-Watts, e.g., 0.0001 kW. He:Cd lasers are typically single transverse mode, but due to the low efficiency of these lasers (<0.025%) it is very difficult to scale these lasers to high power levels, consequently, they are not suitable for high power material processing applications.

(ii) Ar-ion lasers are very inefficient, and as a consequence are limited to relatively lower power, less than about 0.005 kW multi-lines. These lasers, at these low powers, are single transverse mode with multiple wavelengths operating. Lifetime of these systems are typically, <5,000 hours which is relatively short for most industrial applications.

(iii) Blue diode lasers have are recently becoming available. They however are low power, typically less than 0.0025 kW, and have poor beam quality, e.g., $M^2>5$ in the slow axis and $M^2\sim1$ in the fast axis. The devices today have lifetimes on the order of 20,000 hours and are suitable for many industrial and commercial laser applications. When scaling these devices up to 200 Watts or more, the beam quality decreases with each incremental increase in power. For example at 200 Watts, the $M^2>50$.

(iv) Frequency doubled blue laser sources are typically limited to about 0.50 kW or so output power. The methods for creating blue light can be either frequency doubling a 800s-900s nm range light source or using sum-frequency mixing of two different wavelengths to generate a third. Either technique requires the use of a non-linear doubling crystal such as Lithium Niobate or KTP. These crystals are relatively short and as a consequence, they require high peak power levels to achieve efficient conversion. When operating in a CW mode, thermal issues as well as charge migration issues can result in the rapid degradation of the crystal and consequently, the output power of the laser.

(v) Fiber lasers that are frequency shifted and then frequency doubled into the blue require the use of a non-linear doubling crystal such as Lithium Niobate or KTP. These crystals are relatively short and as a consequence, they require high peak power levels to achieve efficient conversion. When operating in a CW mode, thermal issues as well as charge migration issues can result in the rapid degradation of the crystal and consequently, the output power of the laser.

Prior to the present inventions, blue wavelength laser beams were typically obtained by parametric oscillators, four wave mixing and direct doubling. These are all inefficient processes that rely on the use of a non-linear crystal to achieve the blue wavelength. These crystals are incapable of managing the heat loads that occur when laser power approaches a few 100 W (0.1 kW) CW, let alone a kW and greater powers.

It is believed that these prior types of blue lasers and the laser beam they provided are inadequate for use in laser additive manufacturing processes or systems. These types of prior blue lasers are believed to be incapable of obtaining the high power laser beams, e.g., blue wavelengths having 0.1 kW and greater power, of embodiments of the present inventions. High power frequency doubled laser sources are typically rapidly pulsed sources, which can achieve high peak power levels and consequently high conversion efficiency. These types of prior blue laser also have temporal characteristics for use in most laser additive manufacturing, and in particular in the formation of articles have tight tolerances. These types of prior blue laser cannot provide the high power and CW output of embodiments of the present inventions.

Prior to the present inventions, laser beams in the 450 nm or less were typically obtained by parametric oscillators, four wave mixing, and frequency tripling of an IR source. These are all inefficient processes that rely on the use of a non-linear crystal to achieve the short (200 nm-450 nm) wavelength. These crystals are incapable of managing the heat loads that occur when laser power approaches a few 100 W (0.1 kW) CW, let alone a kW and greater powers.

Prior to the present inventions, laser beams in the 700 nm-800 nm range were typically obtained by pumping a dye laser, parametric oscillators, four wave mixing, and frequency doubling of an IR source. These are all inefficient processes, the dye lasers tend to bleach out in time and have a limited interaction volume making it difficult to achieve high CW power levels. The other processes rely on the use of a non-linear crystal to achieve the 700 nm-800 nm wavelength. These crystals are incapable of managing the heat loads that occur when laser power approaches a few 100 W (0.1 kW) CW, let alone a kW and greater powers.

As used herein, unless expressly provided otherwise, the terms "laser additive manufacturing" ("LAM"), "laser additive manufacturing processes", "additive manufacturing processes" and similar such terms are to be given their broadest possible meanings and would include such processes, applications and systems as 3-D printing, three dimensional printing, sintering, welding, and brazing, as well as any other process that utilizes a laser beam at least during one stage of the making of an article (e.g., product, component, and part) being made. These terms are not limited to or restricted by the size of the article being made, for example they would encompass articles that are from submicron, e.g., less than 1 µm, to 1 µm, to 10 µm, to tens of microns, to hundreds of microns, to thousands of microns, to millimeters, to meters to kilometers (e.g., a continuous LAM process making a ribbon or band of material).

As used herein, unless expressly provided otherwise, the terms "laser beam spot size" and "spot size" are to be given their broadest possible meaning and include: the transverse cross-sectional shape of the laser beam; the transverse cross sectional area of the laser beam; the shape of the area of illumination of the laser beam on a target; the area of illumination of a laser beam on a target; the "maximum intensity spot size", which is the cross sectional area of the laser beam in which the laser beam is at least $1/e^2$ or 0.135 of its peak value; the "50% intensity spot size", which is the cross sectional area of the laser beam in which the laser beam is at least 0.00675 of its peak value; and the cross sectional area of the laser beam in which the laser beam has functional properties.

As used herein, unless expressly provided otherwise, the terms "functional additive manufacturing laser beam", "functional beam", "functional laser beam" and similar such terms, mean laser beams having the power, wavelength, fluence, irradiance (power per unit area) and combinations and variations of these properties to form or build the starting or target materials into an article; by having the laser beam effect these materials, e.g., sinter, braze, anneal, weld, melt, join, tackify, soften, cross-link, bond, react, etc.

As used herein, unless expressly provided otherwise, the term "about" is meant to encompass a variance or range of ±10%, the experimental or instrument error associated with obtaining the stated value, and preferably the larger of these.

As used herein, unless expressly provided otherwise, the terms "optics", "optical element", "optical system", and similar such terms should be given their broadest meaning and would include: any type of element or system that is capable of handling the laser beam (e.g., transmitting, reflecting, etc., without being damaged or quickly destroyed by the beam's energy); any type of element or system that is capable of effecting the laser beam in a predetermined manner (e.g., transmit, focus, de-focus, shape, collimate, steer, scan, etc.); elements or systems that provides multiplexed beam shapes, such as a cross, an x shape, a rectangle, a hexagon, lines in an array, or a related shape where lines, squares, and cylinders are connected or spaced at different distances; refractive lenses; diffractive lenses; gratings; transmissive gratings; mirrors; prisms; lenses; collimators; aspheric lenses; spherical lenses; convex lenses, negative meniscus lenses; bi-convex lenses; axicons, gradient refractive lenses; elements with aspheric profiles; elements with achromatic doublets; micro-lenses; micro-arrays; mems steering mirrors such as used in DLP projectors can be used to create and steer images on the fly; lithium niobate beam steering crystals; high speed galvanometers; combinations of linear motors and high speed galvanometers; flying optic head; deformable mirror devices; and combinations and variations of these and other beam handling devices.

This Background of the Invention section is intended to introduce various aspects of the art, which may be associated with embodiments of the present inventions. Thus the forgoing discussion in this section provides a framework for better understanding the present inventions, and is not to be viewed as an admission of prior art.

SUMMARY

There has been a long-standing and unfulfilled need for, among other things, lasers to provide laser beams in the 300 nm-800 nm wavelengths, and in particular blue lasers and laser beams having higher power and high beam qualities, for use in among other things improved additive laser manufacturing process, welding processes, cutting processes, brazing processes, polishing processes, ablation processes and soldering processes. The present inventions, among other things, solve these needs by providing the articles of manufacture, devices and processes taught, and disclosed herein.

There is provided a laser additive manufacturing (LAM) apparatus having: a laser for providing a functional laser beam along a beam path, the functional laser beam having a wavelength less than about 750 nm; a build table; a starting material, and a starting material delivery apparatus, wherein the starting material can be delivered to a target area adjacent the build table; a laser beam delivery apparatus, having a beam shaping optic to provide a functional laser beam and form a laser beam spot; a motor and positioning apparatus, mechanically connected to the build table, the laser beam delivery apparatus, or both; whereby the motor and positioning apparatus are capable of providing relative movement between the laser beam delivery apparatus and the build table; and, a control system, the control system having a processor, a memory device and a LAM plan, wherein the control system is capable of implementing the LAM plan through the predetermined placement of the functional laser beam and the starting material.

Yet further there is provided systems, apparatus and methods that have one or more of the following features: wherein the laser has a pump laser diode having a wavelength of less than 500 nm and a Raman oscillator fiber; wherein the laser has a pump laser diode and a Raman oscillator that are configured to provide an n-order Raman oscillation, where n is an integer; wherein n is selected from the group consisting of 1, 2, 3, 4, 5, 6, 7, 8 and 9; wherein the n-order oscillation is stokes; wherein the n-order oscillation is anti-stokes; wherein the build material is selected from the group consisting of Magnesium, Aluminum, Gallium, Tin, Lead, Titanium, Vanadium, Chromium, Manganese, Iron, Cobalt, Nickel, Copper, Zinc, Zirconium, Molybdenum, Rhodium, Palladium, Silver, Cadmium, Tungsten, Gold, Mercury, metals, alloys of metals, and mixtures of metals; wherein the starting material is a powder; wherein the starting material is a powder having a particle size less than about 1 µm; wherein the starting material is a powder having a particle size from about 0.05 µm to about 2.5 µm; wherein the starting material is a powder having a particle size from about 0.05 µm to about 2.5 µm; wherein the starting material is a powder having a particle size from about 40 µm and smaller; wherein the starting material is a powder having a particle size less than about 25 µm; wherein the starting material is a powder having a particle size less than about 15 µm; and wherein the starting material is a powder having a particle size less than about 0.5 µm.

Additionally, there is provide a Raman laser modules (RLM) for use in laser additive manufacturing, the RLM having: a pump laser beam source and a Raman oscillator for providing a functional laser beam; the functional laser beam having a wavelength less than about 700 nm, a $M^2$ of less than 2, and a power of greater than 500 W.

Still further there is provided apparatus, systems and methods having one or more of the following features: wherein the Raman oscillator has a fiber oscillator having a material selected from the group consisting of Silica, $GeO_2$ doped silica, Phosphorus doped silica; wherein the pump laser source has a diode laser; wherein the pump laser source has a plurality of laser diodes to produce a pump laser beam having a beam parameter product of less than about 10 mm-mrad; wherein the pump laser source has an array of at least 20 blue laser diodes; wherein the array provides a pump laser beam having a wavelength in the range of about 405 nm to about 460 nm; wherein the oscillator fiber has a length and the length is about 30 m or less; wherein the oscillator fiber has a length and the length is about 20 m or less; wherein the oscillator fiber has a length and the length is about 25 m or less; wherein the oscillator fiber has a length and the length is about 40 m or less; and wherein the functional laser beam has a wavelength from about 405 nm to about 470 nm.

Furthermore, there is provided apparatus, methods and systems wherein the pump laser source has a blue laser diode system, the system providing a pump laser beam having a wavelength of about 405 nm-475 nm, a power of greater than 100 W; and wherein the Raman oscillator fiber has a core diameter of about 10 µm-50 µm and is a graded index fiber or a step index fiber.

Yet additionally there is provided a means to cool the lasers, including the pump laser source, which cooling means can be air cooling using active or passive air cooling, liquid cooling, such as using a coolant or refrigerant, and water cooling, such as using a closed loop water cooling system.

Furthermore, there is provided apparatus, methods and systems having one or more of the following features: wherein the pump laser source has a spectral beam combiner; wherein laser beams from the RLMs are coherently combined to form a single functional laser beam; wherein the pump laser source has a laser diode and integral drive electronics to control the current and enable the rapid pulsing of the pump laser source diode to provide a pulsed pump laser beam; and wherein the pulse rate to from about 0.1 MHz to about 10 MHz.

Still further, there is provide a 3-D printing apparatus having a starting material delivery apparatus, wherein a starting material can be delivered to a target area adjacent a predetermined build area; a beam shaping optic to provide a functional laser beam spot having a cross section of less than about 100 microns at the build area; and a Raman laser module (RLM).

Yet further, there is provided a LAM system, including a 3-D printing apparatus having a RLM one or more of the RLMs described in this specification.

Additionally, there is provided a method of laser additive manufacturing (LAM), the method including: providing a starting material, the starting material having a predetermined maximum absorption wavelength; directing a functional laser beam having a predetermined wavelength to the starting material, the functional laser beam wavelength being based at least in part to match the starting material maximum absorption wavelength; the functional laser beam interacting with the starting material to build an article.

Moreover, there is provided methods, systems and apparatus having one or more of the following features: wherein the functional laser beam wavelength and the maximum absorption wavelength are matched within 100 nm of each other; wherein the functional laser beam wavelength and the maximum absorption wavelength are matched within 50 nm of each other; wherein the functional laser beam wavelength and the maximum absorption wavelength are matched within 10% of each other; wherein the functional laser beam wavelength and the maximum absorption wavelength are matched within 20% of each other; wherein the functional laser beam wavelength and the maximum absorption wavelength are matched, wherein they are the same wavelength; wherein the article is built in a single step; wherein the article has: a Thermal Expansion µm/(m-K)(at 25° C.) of 7.5 to 32; Thermal Conductivity W/(m-K) of 18 to 450; Electrical Resistivity nΩ-m (at 20° C.) of 14 to 420; Young's Modulus GPa of 40 to 220; Shear Modulus GPa of 15 to 52; Bulk Modulus GPa 40 to 190; Poisson ratio of 0.2 to 0.5; Mohs hardness of 1 to 7; Vickers hardness MPa of 150 to 3500; Brinell hardness MPa 35 to 2800; Density $g/cm^3$ 1.5 to 21; wherein the article has: a Thermal Expansion µm/(m-K)(at 25° C.) of 7.5 to 32; Thermal Conductivity W/(m-K) of 18 to 450; Young's Modulus GPa of 40 to 220; Shear Modulus GPa of 15 to 52; Bulk Modulus GPa 40 to 190; Poisson ratio of 0.2 to 0.5; and Density $g/cm^3$ 1.5 to 21; wherein the article has: Electrical Resistivity nΩ-m (at 20° C.) of 14 to 420; Poisson ratio of 0.2 to 0.5; and Mohs hardness of 1 to 7; wherein the article has: a Thermal Expansion µm/(m-K)(at 25° C.) of 7.5 to 32; Electrical Resistivity nΩ-m (at 20° C.) of 14 to 420; Young's Modulus GPa of 40 to 220; Mohs hardness of 1 to 7; and Density $g/cm^3$ 1.5 to 21; and wherein the article has a physical property selected from the group consisting of: a Thermal Expansion µm/(m-K)(at 25° C.) of 7.5 to 32; Thermal Conductivity W/(m-K) of 18 to 450; Electrical Resistivity nΩ-m (at 20° C.) of 14 to 420; Young's Modulus GPa of 40 to 220; Shear Modulus GPa of 15 to 52; Bulk Modulus GPa 40 to 190; Poisson ratio of 0.2 to 0.5; Mohs hardness of 1 to 7; Vickers hardness MPa of 150 to 3500; Brinell hardness MPa 35 to 2800; and Density $g/cm^3$ 1.5 to 21.

Yet moreover, there is provided apparatus, systems and methods having one or more of the following features: wherein the Raman oscillator has a crystal oscillator having material selected from the group consisting of Diamond, KGW, $YVO_4$, and $Ba(NO_3)_2$; wherein the Raman oscillator has a high pressure gas; wherein the pump laser source has a plurality of laser diodes to produce a pump laser beam having a beam parameter product of less than about 14 mm-mrad; and wherein the pump laser source has a plurality of laser diodes to produce a pump laser beam having a beam parameter product from about 9 to about 14 mm-mrad.

BRIEF DESCRIPTION OF THE DRAWINGS

FIG. 2 is a cross sectional view of an embodiment of starting material in a stage of a LAM process in accordance with the present inventions.

FIG. 2A is a cross sectional view of an embodiment of an article formed from the starting material of FIG. 2 in a later stage of an embodiment of the LAM process in accordance with the present inventions.

FIG. 2B is a cross sectional view of embodiment of starting material and the article of FIG. 2A in a later stage of an embodiment of the LAM process in accordance with the present inventions.

FIG. 3 is a cross sectional view of an embodiment of a LAM article in accordance with the present inventions.

FIG. 4 is a cross sectional view of an embodiment of a LAM article in accordance with the present inventions.

FIGS. 13A to 13C are charts showing Raman stokes shifts and Raman cascades for Raman fibers and Raman Crystals of various materials in accordance with the present inventions.

FIGS. 14A to 14C are charts showing Raman anti-stokes shifts and Raman cascades for Raman fibers and Raman Crystals of various materials in accordance with the present inventions.

DESCRIPTION OF THE PREFERRED EMBODIMENTS

In general, the present inventions relate to lasers that produce laser beams having wavelengths in about the 200 nm to 800 nm range. In particular, embodiments of the present inventions relate to lasers that produce blue laser beams and applications for these laser beams. Further, embodiments of the present inventions relate to higher power, and high power, lasers and laser beams having wavelengths in the 300-700 nm ranges, and in particular in the 400s nm range and in the 500s nm range; and such lasers and laser beams in these wavelengths having excellent beam qualities. Embodiments of the present inventions further relate to additive manufacturing and laser material processing, and in particular laser additive manufacturing processes as well as welding, brazing, cutting and soldering, using the novel laser beams of the novel lasers of the present inventions.

Further, embodiments of the present inventions relate to predetermined metallic starting materials and predetermined laser wavelengths to perform laser additive manufacturing on these starting materials. In particular, embodiments of the present inventions relate to predetermined laser beam wavelengths matched to metallic starting materials to perform laser additive manufacturing to make metallic articles.

Figure 1:
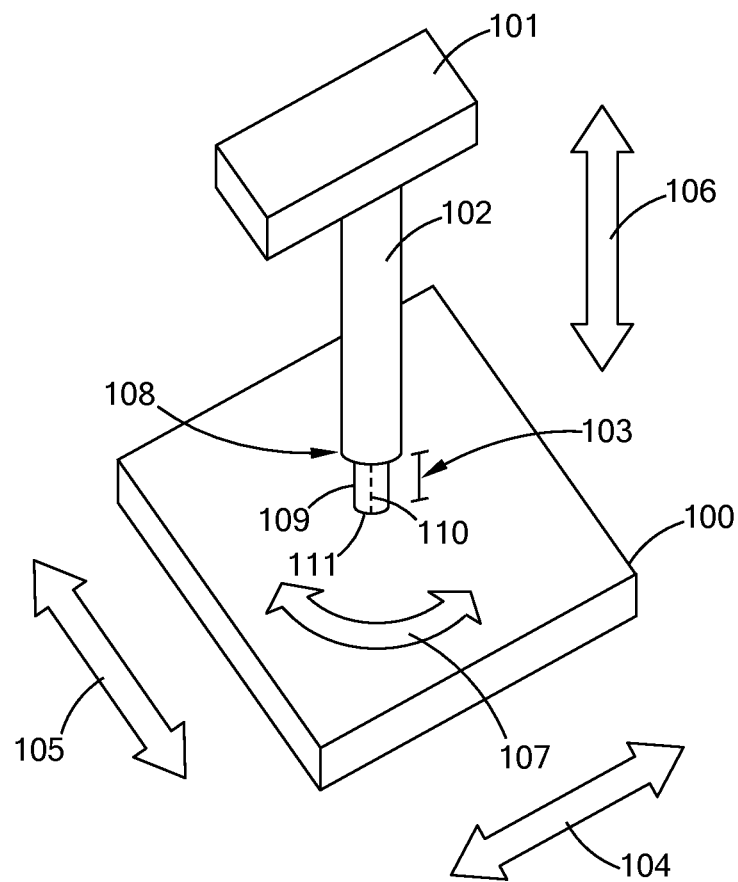
FIG. 1 is a schematic perspective view of an embodiment of a LAM system and process in accordance with the present inventions.

Turning to FIG. 1 there is shown a schematic diagram illustrating an embodiment of a LAM system and process. Thus, there is a base 100, a laser unit 101, a laser beam delivery assembly 102. The laser beam delivery assembly 102 has a distal end 108 that is at a stand off distance 103 from the base 100 (and at a stand off distance from the starting material, when starting material is present on the base). Typically during a LAM process starting material (not shown in the figure) is supported by the base 100. The starting material and the laser beam are then moved relative to each other as the functional laser beam 109 travels along beam path 110, to form a laser spot 111 that contacts the starting material, and joins the starting material together to form an article. The relative motion (e.g., raster scan) of the starting material and the laser spot is illustrated by arrows 104 (e.g., x-axis motion), 105 (e.g., y-axis motion), 106 (e.g., z-axis motion), and 107 (e.g. rotation), additionally the angle at which the laser beam path and the laser beam strikes the base, and thus the starting material on the base, can be changed. The laser spot may also be moved in a vector fashion, where both x and y motion occur simultaneously moving the spot to a predetermined position on the material. The angle of the laser beam on the target in FIG. 1 is at 90° or a right angle to the base. This angle can be varied from 45° to 135°, from 30° to 120°, and from 0° to 180°, and from 180° to 360° (e.g. the article is inverted to make, for example, a U shaped lip.) Further combinations and variations of these different basic relative motions can be performed, in coordination with the firing of the laser beam and deposition of starting material, and in this manner articles of many different shapes, sizes and with varying degrees of complexity can be made. It being understood that these relative motions can be achieved by moving the base, moving the laser delivery assembly, steering the laser beam (e.g., scanning the beam with galvo-scanners) and combinations and variations of these.

The laser unit and the laser beam delivery assembly can be one integral apparatus, or they can be separated and optically connected, for example via optical fibers or a flying optic head. Further, some or all of the components of the laser unit can be in the laser beam delivery assembly, and vice versa. Also, these components, and other components, can be located away from the laser unit and the laser beam delivery assembly. These remote components can be optically associated, functionally associated (e.g., control communication, data communication, WiFi, etc.) and both, with the laser unit and the laser beam delivery assembly. The laser unit and the laser beam delivery assembly generally have a high power laser (preferably the Raman lasers disclosed and taught in this specification or the direct diode lasers disclosed and taught in Ser. No. 62/193,047 the entire disclosure of which is incorporated herein by reference) and beam shaping and handling optics to deliver the laser beam along a laser beam path in a predetermined spot size.

Preferably, the laser unit has a high power laser that is capable of generating, and propagating, a laser beam in a predetermined wavelength and delivers the laser beam to the laser beam delivery assembly, which can shape and deliver the laser beam from the distal end along the laser beam path to the target, e.g., the starting material, which could be on the base or on an article being built.

For example, the laser beam can preferably have one, two, or more of the properties that are set forth in Table I. (A column, or a row, in the table are not for a specific embodiment; and thus, different row properties can be combined with different column properties, e.g., a power in one column could be present for all of the different wavelengths. Thus, a single embodiment may have properties from different columns and different rows of the table.)

the laser beam delivery apparatus, or otherwise associated with it. In this manner the starting material can be delivered, e.g., sprayed, flowed, conveyed, drawn, poured, dusted, on to the base or on to the article being made. Thus, for example the starting material can be delivered through a jet, a nozzle, a co-axial jet around the laser beam, an air knife or doctor blade assembly, any apparatus to deliver the starting material ahead of the movement of the laser beam, spray nozzles, and other devices for delivering and handling the starting material. For example, starting material delivery devices, and processes for delivering starting materials, that are found in 3-D printing applications can be used.

Embodiments of 3-D printing apparatus systems and methods are disclosed and taught in U.S. Pat. Nos. 5,352,405, 5,340,656, 5,204,055, 4,863,538, 5,902,441, 5,053,090, 5,597,589, and US Patent Application Publication No. 2012/0072001, the entire disclosure of each of which is incorporated herein by reference.

A control system preferably integrates, monitors and controls the operation of the laser, the movement of various components to provide for the relative movement to build the article, and the delivery of the starting material. The

TABLE I

| | Range | Examples in range | | | | | | | | |
|---|---|---|---|---|---|---|---|---|---|---|
| Wavelength nm | 375-600 | 405 | 445 | 447 | 450 | 455 | 450 | 520 | 532 | 635 |
| Power kW | 0.5-10+ | 1 | 1.5 | 2 | 2.25 | 2.5 | 2.75 | 3 | 4 | 5 |
| Continuous | Yes | Yes | Yes | Yes | Yes | Yes | Yes | Yes | Yes | Yes |
| Modulation Bandwidth | 0-2 MHz | 2 MHz | 2 MHz | 2 MHz | 2 MHz | 2 MHz | 2 MHz | 2 MHz | 2 MHz | 2 MHz |
| $M^2$ | 1-50 | 1.05 | 1.5 | 1.75 | 2 | 4 | 10 | 15 | 20 | 25 |
| Beam parameter product mm mrad | 0.3 | 0.32 | 0.45 | 0.53 | 0.6 | 1.2 | 3 | 4.5 | 8 | 7.5 |
| Beam waist | 10 μm | 10 μm | 10 μm | 10 μm | 10 μm | 10 μm | 10 μm | 10 μm | 10 μm | 10 μm |
| Numerical Aperture | 0.03 | 0.032 | 0.045 | 0.53 | 0.06 | 0.12 | 0.3 | 0.45 | 0.6 | 0.75 |
| Single Transverse Mode | Yes | Yes | Yes | Yes | Yes | Yes | Yes | Yes | Yes | Yes |
| Multi Transverse Mode | Yes | Yes | Yes | Yes | Yes | Yes | Yes | Yes | Yes | Yes |
| Spot size cross section* μm | ~0.5-300+ | 1 | 2 | 5 | 10 | 15 | 30 | 40 | 60 | 100 |

*cross section is the longest distance across the spot, e.g., slow axis; for a circular spot the cross section is the diameter; for an ellipse it would be the major axis.

The laser beam deliver apparatus contains passive and active laser beam shaping optics to provide a predetermined spot size at the intended stand off distance. The laser beam delivery apparatus can also contain, or have operably associated with monitoring and control devices. For example, the device could have down the pipe viewing with for example a high speed video camera. In this manner the camera looks down the laser beam path to the base and can view the formation of the melt puddle from the laser beams interaction with the starting material. Depth sensors or gauges, location sensors or gauges, laser monitory, Infrared and visible pyrometers for measuring the melt puddle temperature and measuring devices, and other monitoring, analysis and control apparatus may be used. In this manner the LAM process, e.g., the process of building or making the article from the starting material can be monitored, analyzed and controlled. Thus LAM process can be controlled to follow a predetermined application, it can be changed or modified in real-time or the monitoring equipment can provide real time feedback on the densification and quality of the material being processed.

A delivery device for providing the starting material may also be in, adjacent to, or otherwise operably associated with control system may also integrate, monitor and control other aspects of the operation, such as monitoring, safety interlocks, laser operating conditions, and LAM processing programs or plans. The control system can be in communication with, (e.g., via a network) or have as part of its system, data storage and processing devices for storing and calculating various information and data relating to items, such as, customer information, billing information, inventory, operation history, maintenance, and LAM processing programs or plans, to name a few.

A LAM processing program or plan is a file, program or series of instructions that the controller implements to operate the LAM device, e.g., a 3-D printer, to perform a predetermined LAM process to make a predetermined article. The LAM processing plan can be, can be based upon, or derived from, a 3-D drawing or model file, e.g., CAD files, such as files in standard formats including, for example, .STEP, .STL, .WRL (VRML), .PLY, .3DS, and .ZPR. The controller has the LAM processing plan (e.g., in its memory, on a drive, on a storage device, or available via network) and uses that plan to operate the device to perform the LAM process to build the intended article. The controller may have the capability to directly use the 3-D model file, or convert that file to a LAM processing plan. The conversion may be done by another computer, and made directly available to the controller, or held in memory, or on a storage device, for later use. An example of a program to convert a 3-D model file to a LAM processing plan is ZPrint™ from Z Corp.

Figure 11:
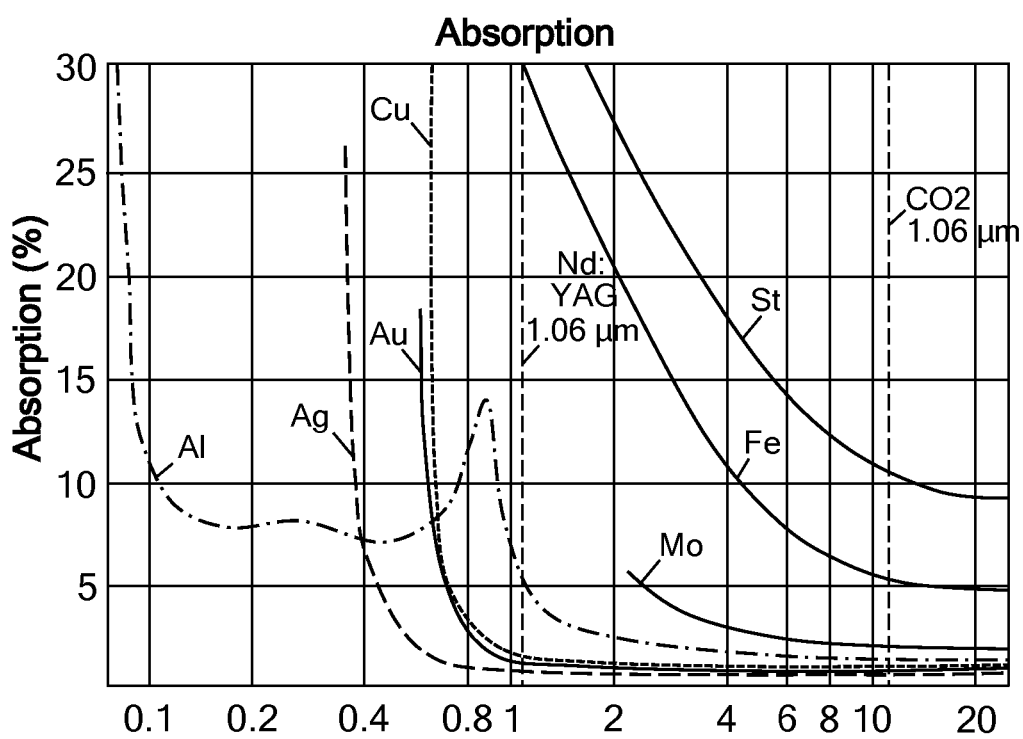
FIG. 11 is a chart showing maximum absorption wavelengths for embodiments of starting materials for use in accordance with the present inventions.
Figure 12:
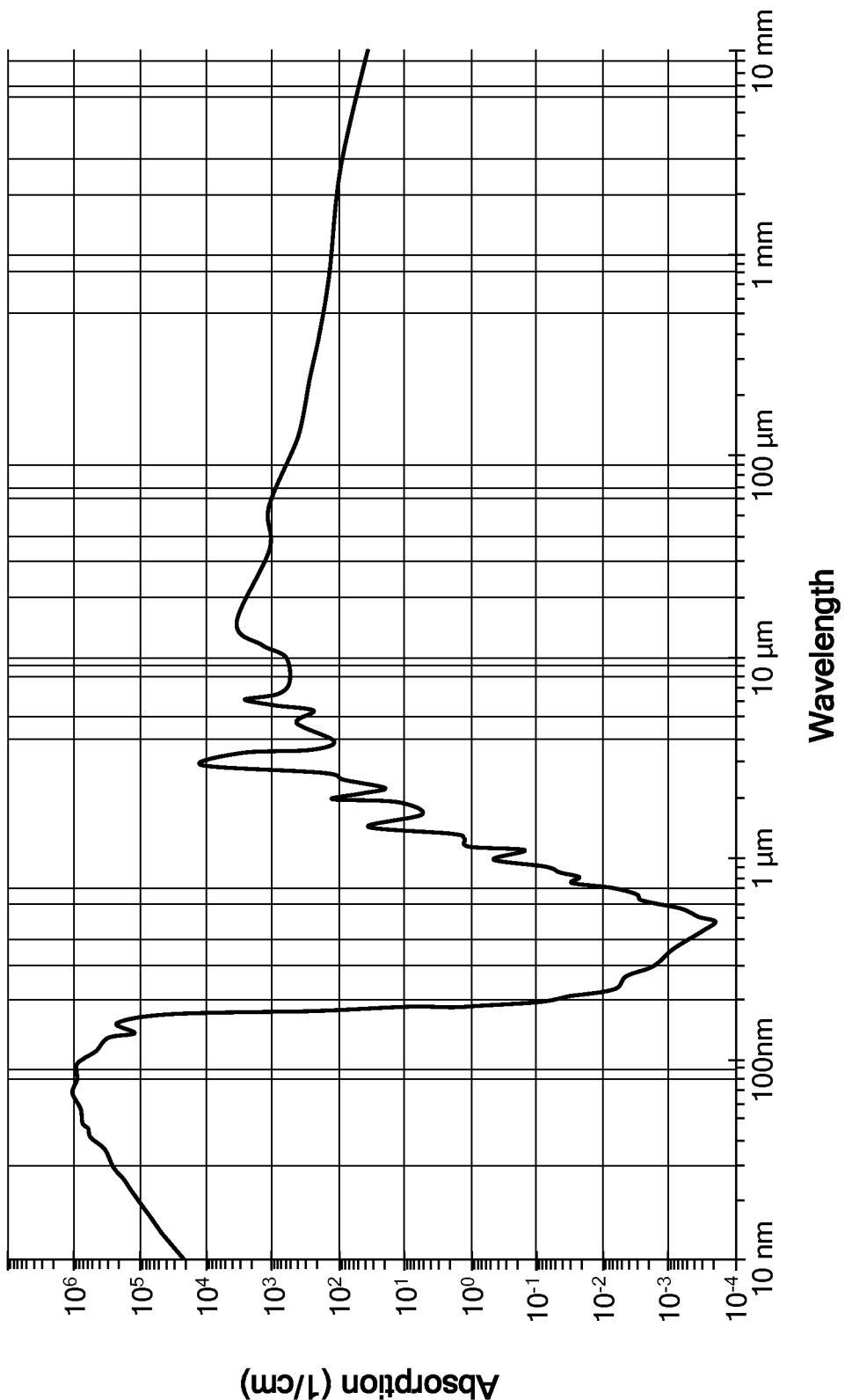
FIG. 12 is a chart showing absorption of water for use in accordance with the present inventions.

The starting materials can be liquids, fluids, solids, inverse-emulsions, emulsions, colloids, micro-emulsions, suspensions, to name a few, and combinations and variations of these. Fluid based starting material systems, e.g., suspensions, colloids, emulsions, have a carrier component and a building component dispersed within the carrier component. The build component interacts with the laser beam to make the article. These starting material systems can have a carrier component that is transmissive to the laser wavelength and a build component that is absorptive to the laser wavelength. Turning to FIG. 11 and FIG. 12 there is shown the absorption characteristics of examples of metallic starting materials, e.g., build materials, and the absorption characteristics of an example of a carrier component, water. It can be seen from these figures that at the 450 nm wavelength the build components are highly absorptive while water is readily transmissive to that wavelength. Thus, for fluid based starting material systems, for a predetermined laser wavelength, and in particular the laser wavelengths of Table I, the build component can have an absorption that is at least 2× the absorption of the carrier component, at least 5× the absorption of the carrier component, at least 10× the absorption of the carrier component, and at least 100× the absorption of the carrier component.

Figure 16:
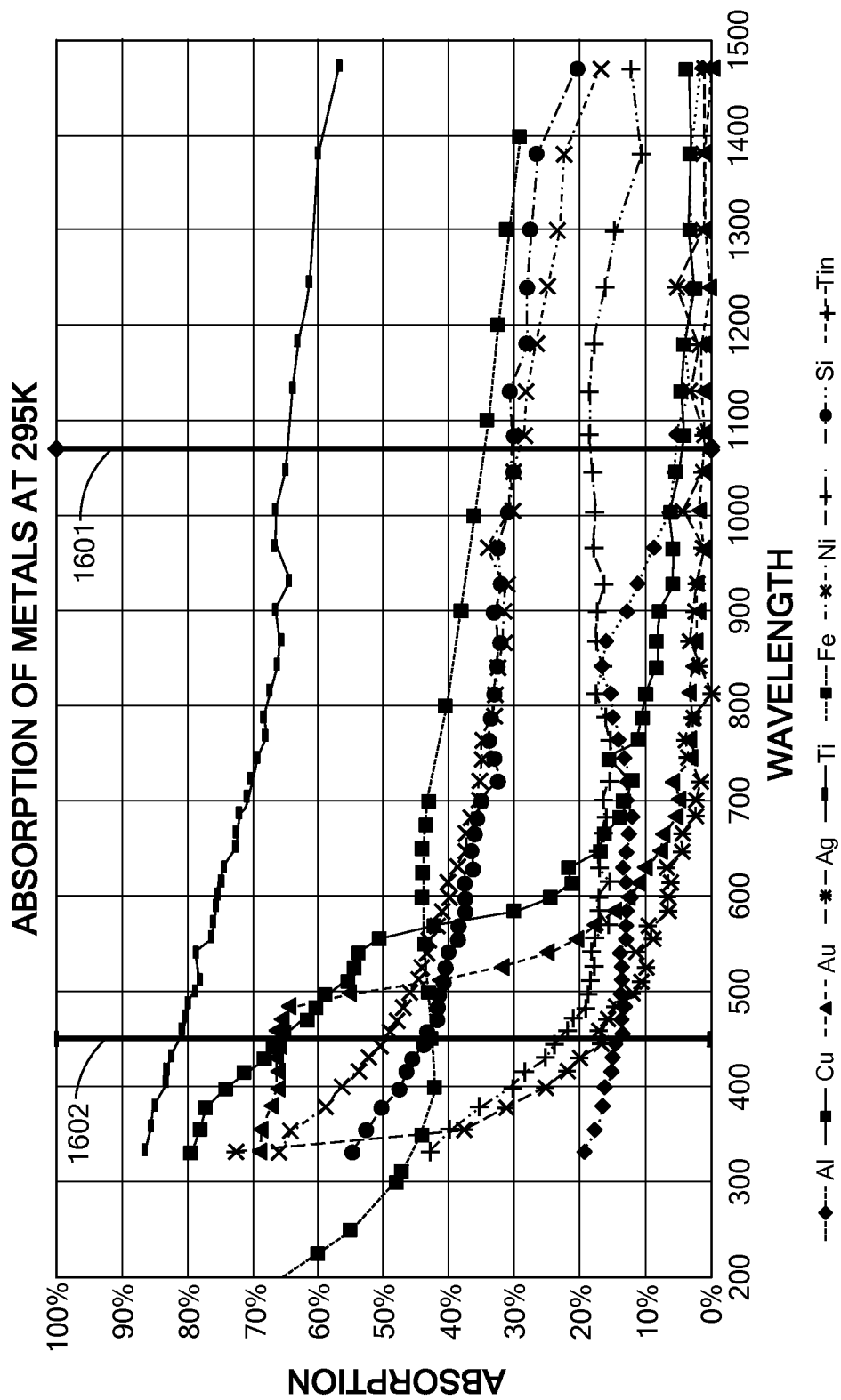
FIG. 16 is graph of the absorption of various metals showing in increased absorption at the wavelengths for embodiments of a laser in accordance with the present inventions.

Turning to FIG. 16 there is shown the absorption characteristics for Alumina, Copper, Gold, Silver, Titanium, Iron, Nickel, Stain Steel 304, and Tin, which can be the bases of, or constitute starting materials. From this graph it is seen that at the wavelengths for embodiments of the present lasers, e.g., line 1602, the absorption for these metals is greater than their absorption at IR wavelengths, e.g., line 1601.

Preferably, for the wavelengths of Table I, the starting materials are metal based particles, e.g., beads, powder, particulate. Thus, embodiments of the starting material can be particles of Magnesium, Aluminum, Gallium, Tin, Lead, Titanium, Vanadium, Chromium, Manganese, Iron, Cobalt, Nickel, Copper, Zinc, Zirconium, Molybdenum, Rhodium, Palladium, Silver, Cadmium, Tungsten, Gold, and Mercury, alloys of these and other metals, Inconel 625, Invar, Stainless Steel, Stainless Steel 304 and mixtures and variations of these and other metals and alloys. Embodiments of the starting materials may be, or include: ceramic materials, such as Silicon Carbide, photo-structurable, aluminosilicate glass-ceramic substrates; Aluminum filled plastics; impact resistant Nylon; Nylon; glass filled Nylon; Flame retardant Nylon; Carbon fiber; Carbon fiber filled Nylon; and Rubber-like plastics, to name a few. Embodiment of systems can also include a flowing gas air knife to insure the optical system remains clean as well as provides a means to capture any volatiles released during the processing of the materials. The particles may also contain metals and other materials such as a ceramic or filler, for example to make a mixed metal complex article or a composite article. Other types of starting materials known to the 3-D printing arts may also be used. Preferably, the functional laser beam wavelength can be matched, e.g., predetermined, to the absorption characteristics of the starting material. Thus, for example, embodiments of starting materials having good to high absorption at 450 nm are shown in FIG. 11 and which are also shown in FIG. 16.

The metallic particles may be incorporated, and preferably, evenly distributed into a fiber or rod, for feeding into the path of the laser beam to build an article. Preferably the carrier for the metallic particles in the fiber or rod, can be incorporated into the alloy being formed establishing the correct ratio of each metal with the metal "tubing" providing the necessary balance of materials in the melt puddle. Additionally, the fiber or rod carrier could be a non-metallic material which is vaporized by the functional laser beam, removed by the air knife system, with minimal, negligible or no effect on the starting materials or the built article. The carrier material may also be selected to form a part of the article, such as a composite article. For example the functional laser beam may have absorption characteristics that provide for the fusing of the metal particles creating a matrix for the article that is then filled in with the carrier material.

The novel and new lasers and high power laser beams provide many opportunities for these types of predetermined starting material combinations to take advantage of different absorption characteristics and build materials and articles that were not obtainable with prior 3-D printing, and which were not generally obtainable at wavelengths below about 700 nm. Further, if the metal particles are in the sub-micron range there is provided the ability to build unique and new nano-composite articles and nano-composite materials.

It should be understood that an article, and a built or made article, can be, for example, a finished end product, a finished component for use in an end product, a product or component that needs further processing or additional manufacturing steps, a material for use in other applications, and a coating on a substrate, for example a coating on a wire.

The particles of the starting material can be composed entirely of a single metal or a single alloy, can be composed entirely of a mixture of several metals, alloys and both, can be composed of from about 5% to about 100% of a metal, an alloy, or both. The metal based component of the starting material particle can be located on the exterior of the particle, so as to be directly contacted by the laser beam and so as to be available for joining particles together. The particles can be the same shape, essentially the same shape or they can be different shapes. The particles can be essentially the same size or they can be different sizes. The particles can have cross sections from about <1 μm to about 1 mm, about 1 μm to about 100 μm, about 1 μm to about 5 μm, about 0.05 μm to about 2.5 μm, about 0.1 μm to about 3.5 μm, about 0.5 μm to about 1.5 μm, about 1 μm to about 10 μm, about 0.1 μm to about 1 μm, and larger and smaller sizes. The particle size, e.g., cross section, can have a predetermined size with respect to a predetermined functional laser beam wavelength. Thus, for example the particles can have a size that is about 1/10 of the laser beam spot size, the same as the laser beam wavelength, 2× larger than the wavelength, 3× larger than the wavelength, 5× larger than the wavelength, and 10× larger than the wavelength, as well as, smaller and larger sizes. Preferably, the use of particles having a size smaller than the laser beam spot and a laser beam spot about the same size of the laser beam, e.g., a single mode diffraction limited beam forming its smallest spot, can provide very high resolution articles, e.g., high resolution 3-D printing.

The particle size and shape can be predetermined with respect to a predetermined functional laser beam spot. Thus, for example the particles can have a size that is smaller than the laser beam spot (e.g., ½, ⅕, 1/10), that is about the same as the laser beam spot, 2× larger than the spot, 3× larger than the spot, 5× larger than the spot, and 10× larger than the spot. The particles can have shapes that are essentially the same as the shape of the laser beam spot, e.g., spherical beads for a circular spot, or that are different, and combinations and variations of these.

For a batch of particles in a starting material that has a particle size distribution, when referring to the size of the particles the median particle size distribution, e.g., $D_{50}$, can be used. Typical 3-D printing machines have an average particle size of 40 μm with the particles ranging in size from 15 μm to 80 μm. Particle distributions that are more tightly controlled are preferred and will improve the surface roughness of the final printed part.

The shape of the particles in the starting material can be any volumetric shape and can include for example, the following: spheres, pellets, rings, lenses, disks, panels, cones, frustoconical shapes, squares, rectangles, cubes, channels, hollow sealed chambers, hollow spheres, blocks, sheets, coatings, films, skins, slabs, fibers, staple fibers, tubes, cups, irregular or amorphous shapes, ellipsoids, spheroids, eggs, multifaceted structures, and polyhedrons (e.g., octahedron, dodecahedron, icosidodecahedron, rhombic triacontahedron, and prism) and combinations and various of these and other more complex shapes, both engineering and architectural. The preferred particles shape is essentially nearly perfect spheres, with a narrow size distribution, to assist in the flowing of the particles through the system as well as reducing the surface roughness of the final part produced. Any shape that reduces the stiction, friction and both, between particles is preferred when the average particle size is smaller than 40 μm.

Turning to FIG. 2 to 2B there is shown a schematic representation of an embodiment of a LAM process. In FIG. 2 there is shown a simplified schematic of several starting material particles, e.g., 201, 202, 203 forming two layers 204, 205. In operation the function laser beam interacts with the starting material particles fusing them together to form, as is seen in FIG. 2A, an initial section 206 of the article 207. In FIG. 2B, an additional layer 208 of starting material particles, e.g., 209, is placed on the initial section 206. The functional laser beam then fuses the additional layer 208 with the initial section 206, further building the article 207. This process is then repeated until the article is completed.

In the embodiment of the process and article of FIG. 2 to 2B the article is build as an essentially solid monolithic material, as shown for example in initial section 206. The LAM devices and process, and in particular LAM devices using the laser beams of Table I have the ability to make articles that are exceeding strong without the need for a separate infiltration, or resin infiltration step, to strengthen the article. Thus, embodiments of the present LAM devices and processes can make articles in a single step (i.e., without a subsequent reinfiltration process, filling, or refilling type process) that can be 2×, 3×, 4×, 10× or more stronger that articles made by a single process, as well as articles made by a two step reinfiltration process, with current 3-D printers. Thus, embodiments of the present LAM built, e.g., 3-D printed, articles of the present inventions can have the properties that are set out in Table II.

TABLE II

| Embodiment of an Article | Thermal Expansion μm/(m-K) (at 25° C.) | Thermal Conductivity W/(m-K) | Electrical Resistivity nΩ-m (at 20° C.) | Young's Modulus GPa | Shear Modulus GPa | Bulk Modulus GPa | Poisson ratio | Mohs hardness | Vickers hardness MPa | Brinell hardness MPa | Density g/cm³ |
|---|---|---|---|---|---|---|---|---|---|---|---|
| 1 | 8.6 | 21.9 | 420 | 116 | 44 | 110 | 0.32 | 6.0 | 830-3420 | 716-2770 | 4.506 |
| 2 | 23.1 | 237 | 28.2 | 70 | 26 | 76 | 0.35 | 2.75 | 160-350 | 160-550 | 2.70 |
| 3 | 18.9 | 429 | 15.87 | 83 | 30 | 100 | 0.37 | 2.5 | 251 | 206-250 | 10.49 |
| 4 | 14.2 | 318 | 22.14 | 79 | 27 | 180 | 0.4 | 2.5 | 188-216 | 188-245 | 19.30 |
| 5 | 22.0 | 66.8 | 115 | 50 | 18 | 58 | 0.36 | — | — | 50-440 | 5.769 |
| 6 | 11.8 | 80.4 | 96.1 | 211 | 82 | 170 | 0.29 | 4 | 608 | 200-1180 | 7.874 |
| 7 | 24.8 | 156 | 43.9 | 45 | 17 | 45 | 0.29 | 1-2.5 | — | 44-260 | 1.738 |
| 8 | 30.2 | 116 | 59.0 | 108 | 43 | 70 | 0.25 | 2.5 | — | 327-412 | 7.14 |
| 9 | 16.5 | 401 | 16.78 | 126 | 48 | 140 | 0.34 | 3.0 | 343-369 | 235-878 | 8.96 |

Embodiments of LAM built articles and materials, and in particular, articles that are build by a single step 3-D printing process can have, one or more of the following properties: Thermal Expansion μm/(m-K)(at 25° C.) of 0 to 32; Thermal Conductivity W/(m-K) of 18 to 450; Electrical Resistivity nΩ-m (at 20° C.) of 14 to 420; Young's Modulus GPa of 40 to 220; Shear Modulus GPa of 15 to 52; Bulk Modulus GPa 40 to 190; Poisson ratio of 0.2 to 0.5; Mohs hardness of 1 to 7; Vickers hardness MPa of 150 to 3500; Brinell hardness MPa 35 to 2800; Density g/cm³ 1.5 to 21, and combinations of these and other features and properties.

Turning to FIG. 3 there is shown an embodiment of an article, in the form of a built skeleton 301, of metal starting materials that can be formed by selectively fusing metal starting materials using a function laser beam pursuant to a LAM processing plan. The skeleton 301 has interconnected filaments, e.g., 302, 303 and voids, e.g., 304. Further LAM processes or other process may be performed on this article 301, or it may be a finished article, e.g., a filter.

Turning to FIG. 4, there is shown an embodiment of a built article 400 that is made up of several different size starting material particles, e.g., 401, 403, 404. The particles are fused together at joints, e.g., 405, 406, 407 and form voids, e.g., 408. Further LAM processes, or other process, may be performed on this article 400, or it may be a finished article.

Figure 5:
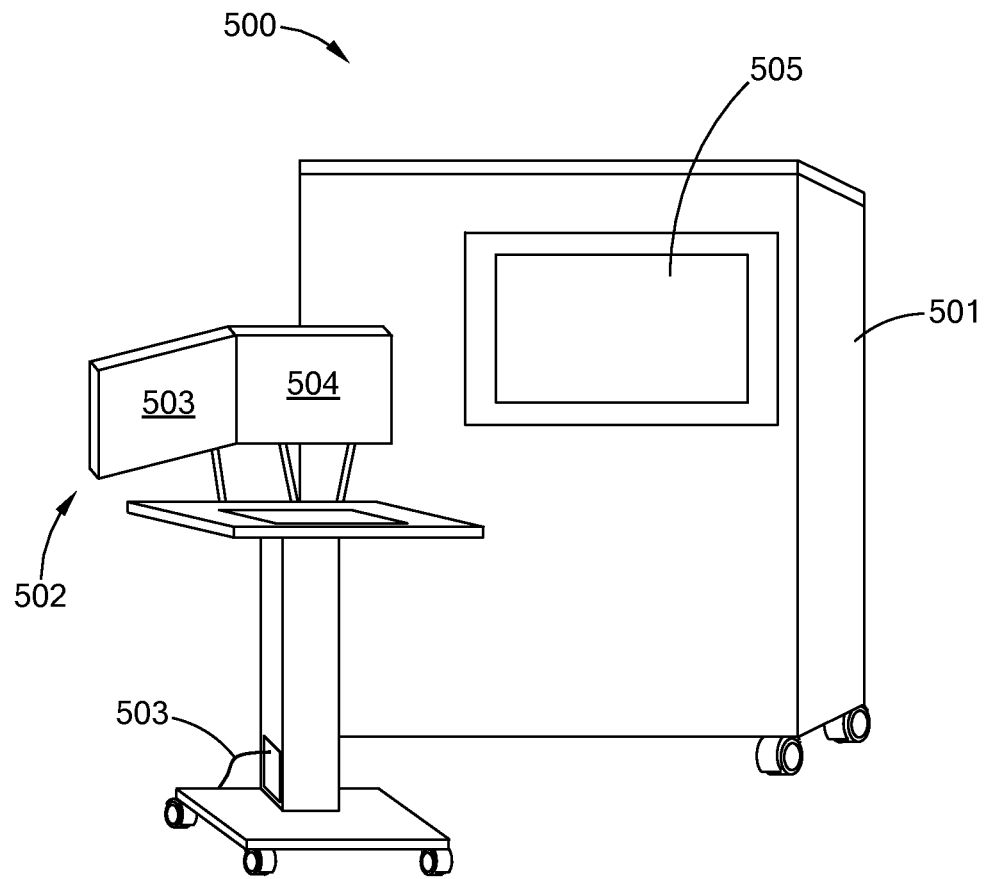
FIG. 5 is a perspective view of a LAM system in accordance with the present inventions.

Turning to FIG. 5 there is shown a perspective view of an embodiment of a LAM system 500. The system 500 has a cabinet 501 that contains the laser unit, the laser beam delivery assembly and the base. The cabinet 501 also contains the motors, sensors, actuators, nozzles, starting material delivery devices, and other devices used to perform the relative motion and to deliver the starting material in a predetermined manner, e.g., the equipment and devices to implement the LAM processing plan. The cabinet 501, and more specifically the components within the cabinet 501, are in data and control communication with an operation station 502, having a controller, via cable 503. The controller can be a PLC (programmable logic controller), an automation and device controller, a PC, or other type of computer that can implement the LAM processing plan. In this embodiment the operation station has two GUI (graphic user interfaces) 503, 504, e.g., monitors. The cabinet 501 has an access panel 505, which may be a window having laser safe glass.

In embodiments of the LAM system, the system, and preferably the cabinet, can contain the following additional components: automatic air filters, starting material bulk storage, compressor for delivering air to clean the finished article, internal filtering system to enable the build area (e.g., the location where the functional laser beam is interacting with and fusing the starting materials) to remain clean and free of dust or other materials that would interfere with the laser beam's travel along the laser beam path. Further, the controller can be located in the cabinet, adjacent to the cabinet, or in a remote location, but in control and data communication with the system. Oxygen monitors in both the build chamber and filter can also be used, and preferably are used, to continuously monitor the absence of oxygen.

Figure 6:
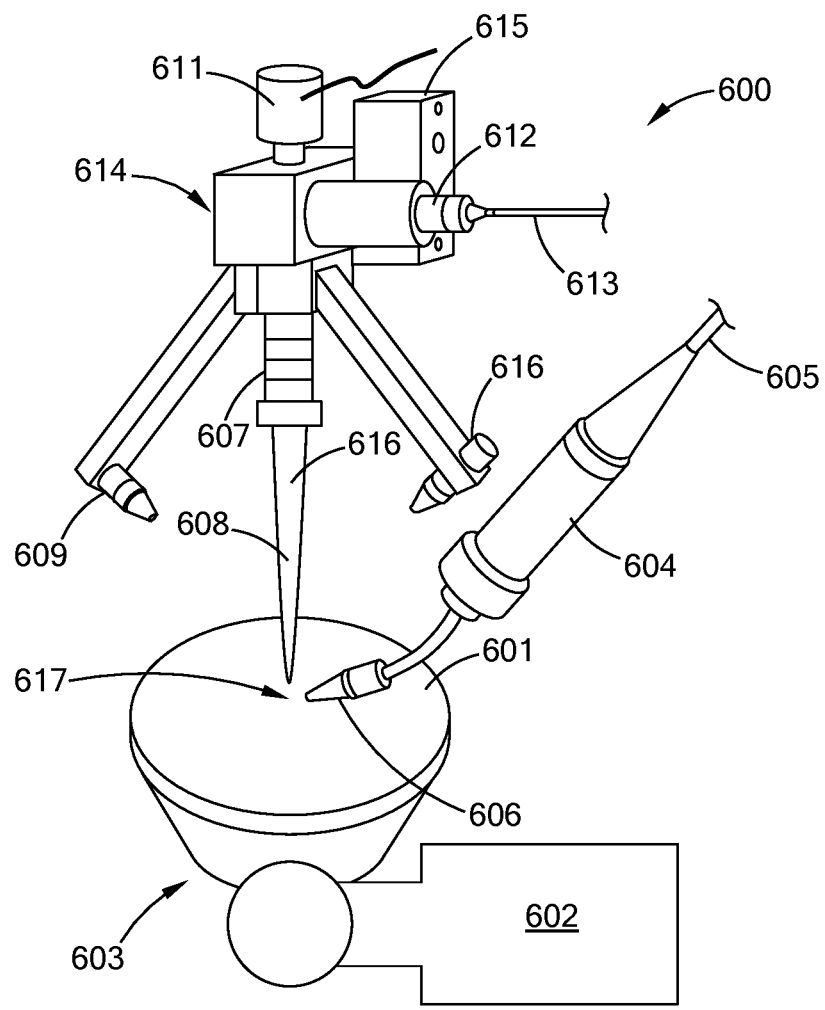
FIG. 6 is a perspective view of a LAM system in accordance with the present inventions.

Turning to FIG. 6 there is provided a perspective view of a LAM build area 600. The build area 600 has a build table 601 that has a drive motor 602, which is connected to the table 601 by articulated robot 603. In this manner the motion of the table, turning, angle, standoff distance can be controlled. A starting material delivery assembly 604 has a starting material feed line 605 and a nozzle 606 positioned adjacent the location where the laser beam 608 is targeted. The laser beam 608 is delivered from the laser head 614. The laser head 614 has a camera 611 for viewing the LAM process, a connector 612 and optical fiber 613 for delivering the functional laser beam from the laser unit, and beam shaping optics assembly 607, e.g., focusing optics, for delivering the laser beam 608 along a laser beam path 616 to the target area 617. The laser head 614 has two laser position determining devices, 609, 610 which use laser beams to measure and monitor the position size and shape of the article as it is built during the LAM process. The laser head 614 has a mount 615 that is connected to a frame not shown. The frame and the drive motor 602 may also be integral and movable to provide additional types of relative motion.

The lower wavelengths ranges, e.g. about 700 nm and below provide significant advantages in LAM and in particular 3-D printing. In these lower wavelength ranges the higher absorptivity of the starting material, and in particular metallic and metal based, starting materials provides, among other things, the ability to perform LAM processes at greater efficiencies. For example, because of the high absorptivity, less laser power is needed to perform the joining of the starting materials to build an article. This can result in faster build times, less expensive LAM devices, LAM devices requiring less maintenance and having longer duty cycles, among other advantages.

For example embodiments of 3-D printers, building metal articles, can have linear print speeds of greater than 1 m/sec., greater than 5 m/sec., and greater than 10 m/sec. Further, and in general depending upon the particular material, a blue laser can cut 2 mm or thinner metal sheets at least about 4× faster than a $CO_2$ laser and at least about 2× faster than a fiber laser. Viewed differently, this enables a 2 kW blue laser to have the same cutting rates for these materials as a 5-8 kW $CO_2$ laser. The increased absorption of the blue laser light is an advantage and preferred where an adiabatic process dominates the laser process such as is the case of cutting, welding, and sintering thin materials. This advantage is less utilized, or provides a smaller benefit, for materials that are 5 mm or thicker where the process if limited by the thermal diffusivity of the material being processed and as a consequence, the absorption properties have less of an effect on the process than just the total power being used.

Additionally, the lower wavelengths provide the ability to have substantially smaller spot sizes and greater control over the building process. In this manner articles with sharper edges, smoother surfaces, and having highly refined surface features and properties, equal to those of finely machined parts are obtainable with the present LAM systems. Fundamentally, the spot size formed by the laser is limited by the wavelength of the source laser, the shorter the wavelength, the smaller the spot size that is formed for a given focal length system. However, if the same spot size is desired, then a longer focal length lens may be used with a blue laser compared to an IR laser, allowing for the blue laser to provided up to 8× the addressable volume of the IR laser source.

The spot size of the system combined with the particle size being fused determines the minimum feature size and surface roughness. Using smaller diameter particles (<40 μ□, <10 μm or <1 μm) with a beam size that is <40 μm, <10 μm or <1 μm can produce a part with a minimum feature sizes on the order of ~40 μm, ~10 μm or ~1 μm resulting in a dramatic improvement in the surface roughness for the part <1 μm. The smaller the spot, and the smaller the particles that are used to form the part means that the shrinkage and stresses in the part can be controlled significantly better than with larger particles and as a consequence greater part stability can be achieved. The smaller, the volume of material processed, the less energy that is required to melt the "voxel", as a consequence the substrate, or part under construction will experience a lower thermal gradient during fabrication and as a consequence, a lower amount of shrinkage as the part "cools" from its processing temperature. Thus, by using less laser power, e.g., lower heat input, to fuse particles into a solid, greater strength and lower warpage of the article being built can be achieved.

Figure 18:
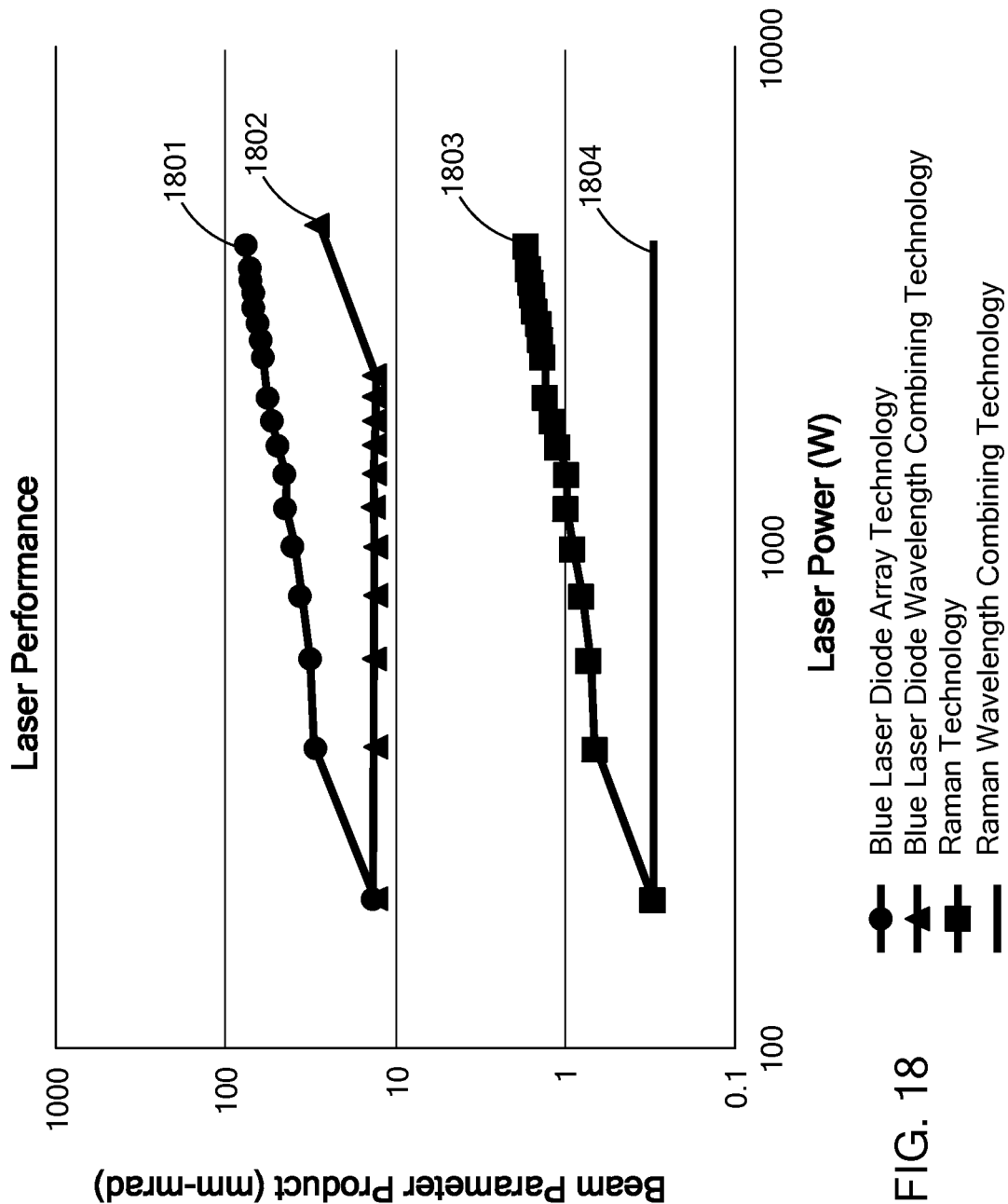
FIG. 18 is graph showing the laser performance of various embodiments of lasers in accordance with the present inventions.

Embodiments of the present lasers provide laser beams in the 300 nm to 800 nm range. Embodiments of the Raman lasers of the present inventions provide laser beams having wavelengths in the 300-700 nm range, and in particular having wavelengths in the 400s nm range and in the 500s nm range. Embodiments of the present Raman lasers have powers of at least about 10 W (0.01 kW), at least about 100 W (0.1 kW), at least about 1,000 W (1 kW), at least about 5 kW and greater. Additionally, the Raman lasers and laser beams of the present inventions have excellent beam quality. Thus, embodiments of these Raman generated laser beams can have the beam parameter scalability shown in FIG. 18. This Figure highlights the beam parameters that can be generated with a direct blue laser diode source (450 nm) line 1801, a wavelength combined blue laser diode source line 1802, a Raman laser source that is optically combined line 1803, and a wavelength combined blue Raman Laser source line 1804. The Raman laser source provides source brightness that is superior to IR lasers of similar power output. The wavelength combined Raman source provides unprecedented power and beam brightness across a wide range of output power levels. The Raman laser source can have a scalability similar to the wavelength combined Raman laser source with the development of large core optical fibers capable of maintaining single mode performance over a wide spectral range (~10 μm for fused silica).

It should be noted that, although the primary focus in this specification is on applications using the Raman high power blue lasers of the present inventions in LAM processes, systems and devices, there are many present, and future, applications for the Raman lasers of the present inventions. Thus, for example, embodiments of the Raman lasers of the present invention can find application in: welding, cutting, heat treating, brazing and surface modification; to pump an n-Raman order fiber laser to achieve any visible wavelength;

to provide a blue Raman laser beam, having at least about 10 W of power for combination with a digital mirror device for projecting a color image including 3-D capability; to provide a blue Raman laser beam, having at least about 10 W of power for entertainment purposes; to provide a blue Raman laser beam, having at least about 10 W of power for pumping a phosphor for producing a white light source that can be used in, among other things, projection systems, headlights, or illumination systems; to provide a blue Raman laser beam, having at least about 10 W of power for underwater laser range-finding; to provide a blue Raman laser beam, having at least about 10 W of power for underwater communications, including encrypted communications; to provide a blue Raman laser beam, having at least about 10 W of power for laser range finding, and in particular laser range finding in high water content environments, such as fog and clouds; to provide a blue Raman laser beam, having at least about 10 W of power for communications, and in particular encrypted communications in high water content environments, such as fog and clouds; to provide a blue Raman laser beam, having at least about 1000 W of power for use as a laser weapon underwater, and in high water content environments, such as fog and clouds; to provide a blue Raman laser beam, having at least about 10,000 W of power for ship and off shore salvage operations, and in particular surface, tidal and sub-surface environments; to provide a blue Raman laser beam, having at least about 1000 W of power for use as a laser weapon on the ocean, less than a few feet above the ocean, through waves in the ocean, and below the surface of the ocean; to provide a blue Raman laser beam, having at least about 1000 W of power for use as a non-lethal laser weapon; to provide a blue Raman laser beam, having at least about 100 W of power for glass cutting; to provide a blue Raman laser beam, having at least about 1000 W of power for removal of paint; to provide a blue Raman laser beam, having at least about 100 W of power for finding diamonds undersea via Raman scattering; to provide a blue Raman laser beam, having at least about 100 W of power for melting AuSn solders and for soldering in general.

Embodiments of the blue Raman lasers of the present invention can find application in most present laser cutting, processing and manufacturing systems. The blue Raman lasers are a ready substitute into these systems, replacing the existing IR (infra red, >700 nm) lasers that are presently used in such systems. The blue Raman laser can provide 2× to 10× increases in efficiency, processing speed and other advantages in these systems over the replaced IR laser. The blue Raman laser can also provided for overall improved systems, having smaller power requirements and smaller foot prints. Thus, for example, embodiments of the blue Raman laser could be used to replace, e.g., swap out, the IR lasers used in a laser system in a manufacturing facility, e.g., a large automobile manufacturing plant. Preferably, this laser swap out can occur with minimal changes to the other components of that laser system such as the beam delivery optics, which need to be coated for the blue wavelength.

In general, embodiments of the blue Raman lasers of the present inventions use solid state lasers to pump an n-order Raman laser to oscillate between 410 nm and 800 nm. In an embodiment an array of blue diode lasers, (having at least 10, at least 50, and at least 1000 diodes) emitting in the 405-475 nm region can pump an n-order Raman laser to oscillate on any orders, e.g., n-Raman orders, between 410 nm to the near infrared 800 nm. It being understood that greater orders or other orders are feasible, and contemplated by the present invention; however, the n-orders in the 405-475 nm range are presently preferred as there are several commercially available laser diodes available in wavelength pump ranges to provide the n-order Raman ranges.

In an embodiment the blue diode laser array can pump an Anti-Stokes Raman laser generating wavelengths as short as 300 nm through n Raman orders. While the gain for the Anti-Stokes is substantially lower than for the Stokes, it is preferable to use a low loss medium when transitioning from the 450 nm pump wavelength to 300 nm.

In an embodiment the blue laser diode pump is based on individual laser diodes either in T056 case or individually mounted. Generally, the pump laser beam from the laser diode is collimated in two axes. The laser diodes can be placed in a modular package prior to inserting into a backplane, where all of the laser diodes can be co-linear and simultaneously focused into a single fiber. The laser diodes can also be mounted onto a single carrier, their beams collimated and launched into a fiber by a single focusing optic. Thus, the laser diode beam can be launched into a dual clad fiber where the outer clad is 20 µm or greater, and the inner core is of sufficient diameter to support single mode operation at the n-th Raman order that will be the output laser wavelength. The ratio of the outer clad to the inner core is limited by the threshold of the n+1 order, where it is desired to pump the $n^{th}$ order but not the n+1. The n+1 can be suppressed by limiting the ratio of the outer to the inner core, the length of the fiber, or by a filter in the resonator to suppress the n+1 order.

In a preferred embodiment Raman blue lasers of the present inventions are scalable to 2.9 kW when pumped by a high brightness blue laser source. At these power levels the conversion efficiency from the blue laser diode pumps to the 455 nm or 459 nm wavelength can be as high as 80%, resulting in a system electrical—optical conversion efficiency of ≥20%.

The Raman conversion process is dependent on, and can be highly dependent on, the modal losses of the optical fiber at the blue wavelength. This loss is primarily due to Rayleigh scattering in the fiber and scales according to the inverse fourth power of the wavelength, consequently, the losses at 450 nm can be on the order of 30 dB/km. This loss can become a concern, and in some embodiments the primary concern, when designing the laser system. To address this loss, embodiments of the present Raman laser can use a short optical fiber (e.g., <15 m, <10 m, <5 m, <3 m). These shorter length embodiments enhance the operational efficiency of the laser. It is understood, however, that longer fibers are contemplated. Thus, Raman oscillating fibers can be 30 m and greater, 50 m and greater, 80 m and greater, and 100 m and greater in length.

Modeling an embodiment of this Raman Laser shows that relatively high output coupler reflectivities can be used to achieve a high oscillating power level at the first Raman conversion order which results in efficient energy transfer to this order. The energy conversion losses due to the Raman shift are nominal since the pump wavelength is 447 nm and the first Raman order can be forced to oscillate at 455 nm. This corresponds to a quantum defect of only 2% with 98% of the energy available at the conversion wavelength. However, the Rayleigh scattering in the fiber limits the conversion efficiency to less than 80% for the shortest fibers modeled (6 m). It being understood that shorter fiber laser, than this modeled laser are contemplated, and that greater and lesser conversion efficiencies are attainable. Conversely, if the Rayleigh scattering can be reduced in an optical fiber, e.g., for a $P_2O_5$ doped fiber which was 85% of the losses of the fused silica fiber, while the gain is a factor of 5 higher, then even greater efficiencies can be achieved.

The Raman conversion lasers of the present inventions are capable of handling n-Raman orders. This capability can be utilized to design a fiber laser output that can oscillate at a predetermined wavelength, and for example at 455 nm or 459 nm. This embodiment can be designed to oscillate simultaneously at different wavelengths, e.g., at both 455 nm and 459 nm. Preferably, the next Raman order is suppressed. This suppression can be achieved, for example, with a good AR coating on the fiber, limiting the length of the fiber and limiting the ratio of the clad to the core, the addition of an in-line lossy filter at the next Raman order and combinations and variations of these.

In addition to fibers, Raman oscillators can be crystals and gases. Raman crystal oscillators can be, for example, Diamond, KGW, YVO$_4$, and Ba(NO$_3$)$_2$. Raman gas oscillators can be, for example, high pressure gases at pressures of for example 50 atmospheres, high pressure hydrogen, and high pressure methane.

Figure 7:
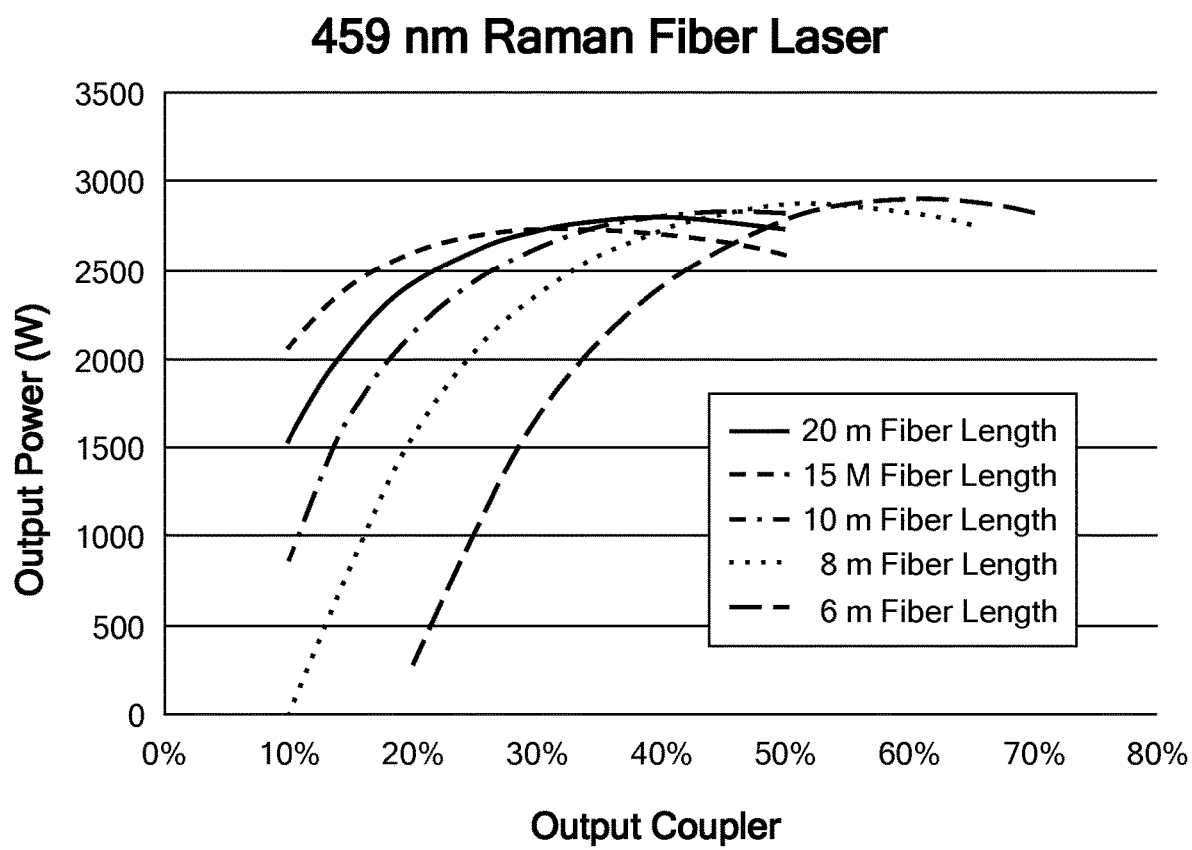
FIG. 7 is a chart of output vs output coupler percentage for various Raman oscillator fiber lengths to provide a 459 nm functional laser beam in accordance with the present inventions.

By combining a cladding pumped Raman laser with laser diode beam combining methods enables the design and construction of a multi-kW fiber laser at wavelength in the 400-800 nm range, for example at 455 nm or 459 nm. FIG. 7 is the predicted output for this laser source when launching up to 4,000 Watts of laser diode power into a 200 µm diameter clad with a 30 µm single mode core as a function of the length of the fiber. FIG. 7 shows the power output in W vs % output coupler for Raman fiber lasers producing 459 nm laser beams from Raman fibers having lengths of 20 m, 15 m, 10 m, 8 m, and 6 m. These shorter length fiber embodiments have the additional advantage of reducing, mitigating, and preferably eliminating, adverse consequences from other non-linear phenomenon, such as Stimulated Brillouin Scattering, while suppressing the next order Raman order oscillation.

In embodiment methods which use a diamond Raman convertor or similar material use a conventional resonator, e.g., a half confocal, or full confocal resonator, combined with a mode-matched pump beam. The diamond is unique because of the very large Stokes Shift and high Raman gain coefficient.

Embodiments of the Stokes Shift for various oscillators are shown in Table III, where the first Stokes shift corresponds to a 29 nm shift in the wavelength of the light, from 450 nm to 479 nm, one of the largest single Stokes shifts feasible with the materials currently available that are transparent at this wavelength. Other Raman conversion methods may be used to achieved high power visible operation, such as for example, launching into a pure fused silica fiber, a GeO$_2$ doped optical fiber, a P$_2$O$_5$ (Phosphorus) doped optical fiber, a KGW crystal pumped by an array of laser diodes or a single laser source, a YVO$_4$ (Yittrium Vanidate) crystal pumped by an array of laser diodes or a single laser source, a Ba(NO$_3$)$_2$ (Barium Nitrate) crystal pumped by an array of laser diodes or a single laser source.

TABLE III

| | 4.50E−05 cm | | | | | | |
|---|---|---|---|---|---|---|---|
| Raman Frequency Shifts | Silica | GeO2 | Phosphorus | Diamond | KGW | YVO4 | Ba(NO3)2 |
| Delta Lambda (cm−1) | 440 | 440 | 1330 | 1332 | 901 | 892 | 1047 |
| 1st Stokes | 459 | 459 | 479 | 479 | 469 | 469 | 472 |
| 2nd Stokes | 469 | 469 | 511 | 511 | 490 | 489 | 497 |
| 3rd Stokes | 478 | 478 | 548 | 549 | 512 | 512 | 524 |
| 4th Stokes | 489 | 489 | 592 | 592 | 537 | 536 | 555 |
| 5th Stokes | 499 | 499 | 642 | 643 | 564 | 563 | 589 |
| 6th Stokes | 511 | 511 | 702 | 703 | 595 | 593 | 627 |
| 7th Stokes | 522 | 522 | 774 | 775 | 628 | 626 | 671 |
| 8th Stokes | 535 | 535 | 863 | 865 | 666 | 663 | 722 |
| 9th Stokes | 548 | 548 | 975 | 977 | 709 | 705 | 781 |

An example of the packaging concept for these laser diodes enables a very compact, high density configuration with a highly modular design that can provide sufficient redundancy for outstanding reliability. Embodiments of the blue diode laser devices oscillate at 450 nm at 20° C. This wavelength can be shifted to lower wavelengths by cooling the diodes, for example the GaN laser diode wavelength shift is on the order of 0.04 to 0.06 nm/° C. The wavelengths can also be lowered by locking the diode with an external grating, such as a Volume Bragg Grating (VBG) or a ruled grating in a Littrow or Littman-Metcalf external cavity. Only a single VBG is needed to lock the entire pump array to the requisite wavelength. Although two, three or more VBGs may be used. The pump wavelength can be 450 nm for Raman lasers oscillating at either 455 nm or 459 nm. It should be noted that the 455 nm line has lower gain, than the 459 nm line, and results in lower conversion efficiencies.

The blue laser diodes pumps are fiber coupled and fusion spliced to the Raman laser, e.g., the Raman oscillator fiber. This is preferable and provides the most robust design, capable of operating under extreme conditions such as high vibration and wide temperature swings. It being recognized that although preferred for extreme conditions other manner of coupling the pump laser, and lasers to the Raman oscillator fibers can be employed such as free space with external optics.

Figure 8:
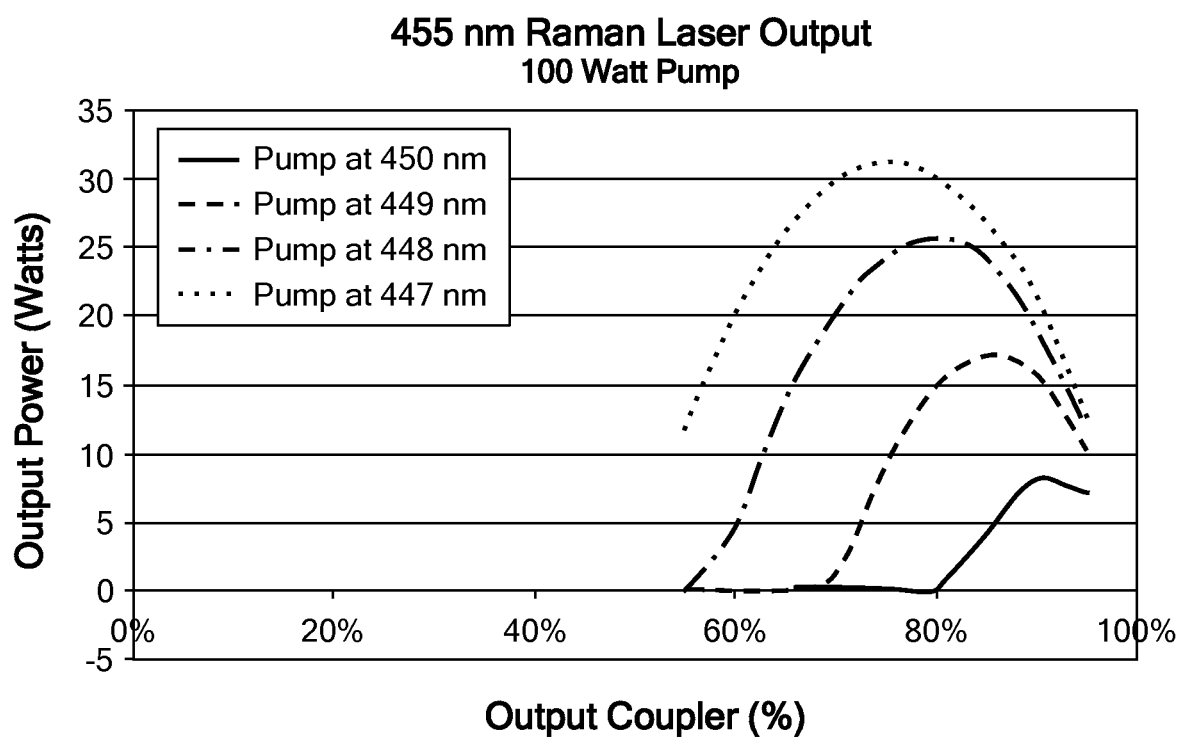
FIG. 8 is a chart of output power vs output coupler percentage at various 100 W pump wavelengths to provide a 455 nm functional laser beam in accordance with the present inventions.

Turning to FIG. 8, there is shown the modeled output of a Raman oscillator fiber laser having a 62.5 µm diameter clad with a 10 µm diameter core. The laser has an HR grating at the pump wavelength on the distal end of the fiber and a HR grating at the first Raman order at the pump input end of the fiber. The reflectivity of the output coupler at the distal end of the fiber at the first Raman order is varied to study the dependence on the fiber length and the pump center wavelength. Designs which require high reflectivity at the first Raman order are preferred for suppression of the second order Raman oscillation but not a requirement. The results for when varying the pump wavelengths from 450 nm, 449 nm, 448 nm, and 447 nm coupled into this Raman oscillator fiber are shown in FIG. 8 for a 455 nm oscillator output thus demonstrating the pump bandwidth for oscillation at the predetermined wavelength. In this graph and model, the output power is shown as a function of the output coupler and the wavelength of the pump source. The fiber is 15 meters in length with a 0.21 na for the 62.5 µm diameter clad. A higher outer cladding na enables even high output power levels to be injected into the cladding.

Figure 9:
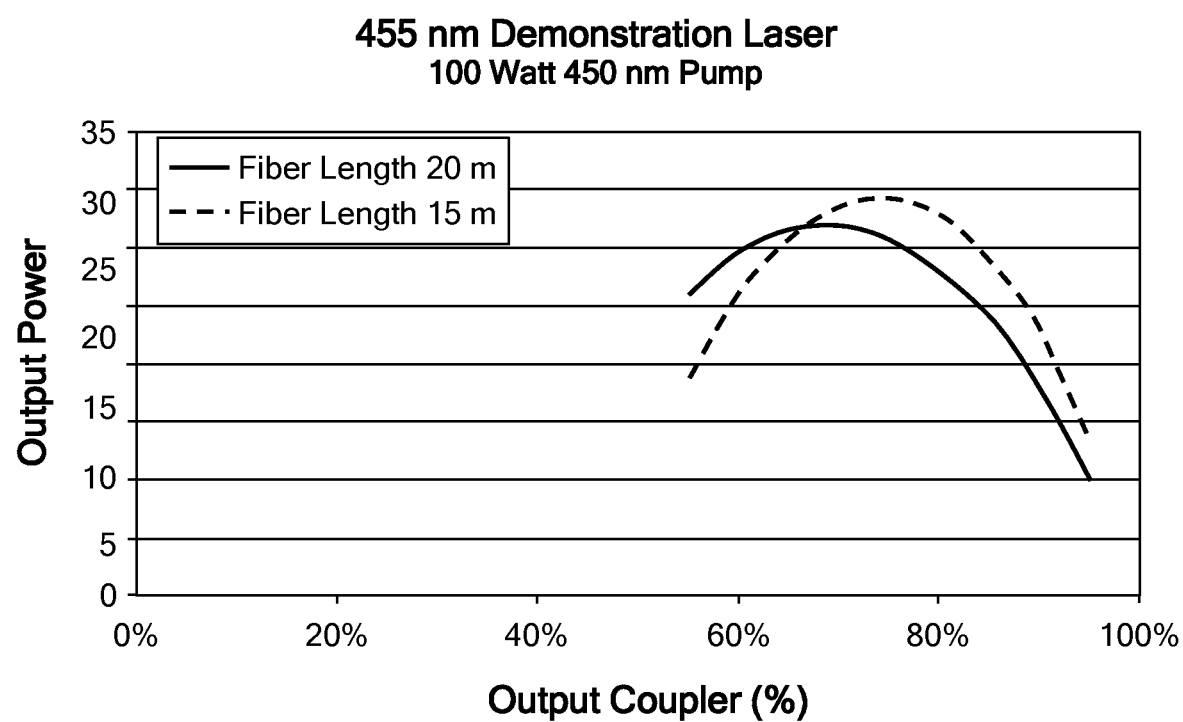
FIG. 9 is a chart of output power vs output coupler for a 455 nm functional laser beam from a 100 W 450 nm pump laser beam at various Raman oscillator fiber lengths in accordance with the present inventions.
Figure 10:
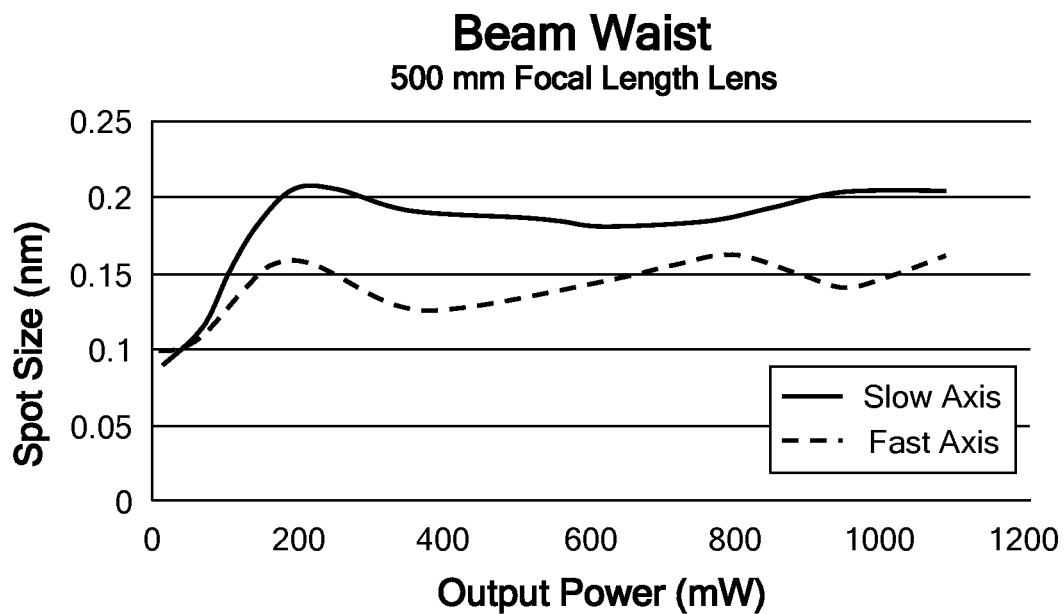
FIG. 10 is a chart of spot size vs beam waist, for a pump laser beam through a 500 mm focal length lens for the slow axis and the fast axis of a collimated laser diode in accordance with the present inventions.

The 459 nm Raman laser simulation results are shown in FIG. 9. In this embodiment the Raman laser is providing a laser beam at 459 nm, where the output power is shown as a function of the output coupler for two fiber lengths, 20 m and 15 m. The clad and core configuration is identical to the embodiment of FIG. 8, and 459 nm is the first Raman order for these fibers when pumped with the 450 nm center wavelength of the laser diodes. This wavelength can be stabilized using a Volume Bragg Grating with a nominal effect on the output power if wide band temperature operation is desired An embodiment of a blue laser diode pump, producing a 450 nm beam, was measured using a 500 mm focal length lens to determine the beam caustic and consequently the fiber diameter that the laser array can be launched into. FIG. 10 shows the beam waist as a function of the output power which does not vary substantially with the output power of the device. This figure shows that the slow axis has a $1/e^2$ waist of 200 μm which translates to a 30 μm beam waist when using an 80 mm focal length lens. FIG. 10 also has the fast axis graphed. This implies that for this embodiment a coupling efficiency in excess of 90% can be achieved into a 62.5 μm diameter fiber. The pump power and brightness can be doubled by using both polarization states prior to launching into the 62.5 μm diameter fiber. Thus in this embodiment there will be about greater than 60 Watts output with 200 Watts input into the Raman oscillator laser fiber.

The high brightness blue laser diodes used in the embodiments of FIGS. 7-10 provide sufficient fluence to create enough gain in the single mode core to allow Raman oscillation and thus provide a Raman generated laser beam. Thus, these present embodiments overcome one of the key issues preventing the development of a visible Raman laser. That issue being the high losses in an optical fiber at visible wavelengths. This is believed to be one of, if not the key reason, why prior to the present inventions a visible Raman oscillator laser was overlooked by the art and has not been demonstrated or proposed by others.

Embodiments of the Raman oscillator of the present inventions can be made from many different types of materials. Preferably, for fibers, they are silica based and would include silica based fibers that have been doped with $GeO_2$ or $P_2O_5$, which characteristics are shown in Table III. Other heavy metals may also be used as dopants for various types of oscillators, where the operating wavelength is close to the band edge for absorption which causes an anomalous Raman gain that can be substantially higher than conventional sources. An example of this for 500 nm light would be Tellurite doped glass where the Raman gain is almost a factor of 40× greater than fused silica. Other dopants may be used with similar results at the target wavelength of 450 nm.

In a preferred embodiment there is a high NA outer cladding, for a double clad fiber with the cladding being relatively low loss at the pump wavelength and the core being >3 μm, >10 μm and including in some embodiments >20 μm. The Clad/Core ratio preferably is maintained below the threshold for self-oscillation of the second Stokes order. The first Stokes gain is determined by the intensity of the light in the clad which is coupled into the core while the gain of the second order Stokes is determined by the oscillation of the first order Stokes in the core. As mentioned previously, this becomes a limiting factor and is dependent on the losses in the fiber, the oscillating power in the first order Stokes, the length of the fiber, and thus total gain, and the feedback if any at the second order Stokes signal. This process ultimately limits the amount of brightness enhancement that can be achieved with this method, which can be address, for example, by the scalability shown in FIG. 18, where the Raman source requires a wavelength beam combination method to achieve high brightness and high power.

Raman amplification has a very wide bandwidth enabling modulation rates well into the GHz regime. This rapid modulation is feasible with the blue Raman laser source because of the short lifetimes associated with the inversion process. The rapid modulation capability can provide significant benefits in additive manufacturing applications, where for example the part has a high spatial frequency, or sharp details that need to be reproduced. Ideally, the faster the laser can be turned on and off, the faster the part can be printed. For example in an embodiment for a given scanning speed, the spatial frequencies of the part become the limitation on the printing rate because a laser which can only be modulated at a few kHz requires the scanners to move at a slow speed to replicate the fine details and spatial frequency of the part, however, a laser which can be modulated in the 10's of GHz regime, allows the part to be rapidly scanned and as a consequence, rapidly printed.

Table IV shows a comparison of the fiber laser build rate to the build rate for an equivalent power level blue laser. This table shows that for a given spot size, the blue laser can achieve a larger build volume and depending on the material being compared speed increases between 1.2× (Titanium) to >80× (gold) based on the enhanced absorption of the laser wavelength.

TABLE IV

| Performance | Fiber Laser (1070 nm) | Blue Laser (459 nm) | Improvement in build speed |
|---|---|---|---|
| Power | 1000 W | 1000 W | |
| Resolution (Spot size diam) | 70 um | 70 um | |
| Build Volume | 24.8" × 15.7" × 19.7" | 48" × 32" × 40" | |
| Print Speed Comparison | cc/hr | cc/hr | |
| Al | 5 | 14 | 262% |
| Cu | 4 | 66 | 1630% |
| Au | 0.8 | 67 | 8275% |
| Ni | 29 | 50 | 173% |
| Ag | 1 | 17 | 1690% |
| SS304 | 30 | 44 | 144% |
| Ti | 65 | 82 | 126% |

Figure 13A:
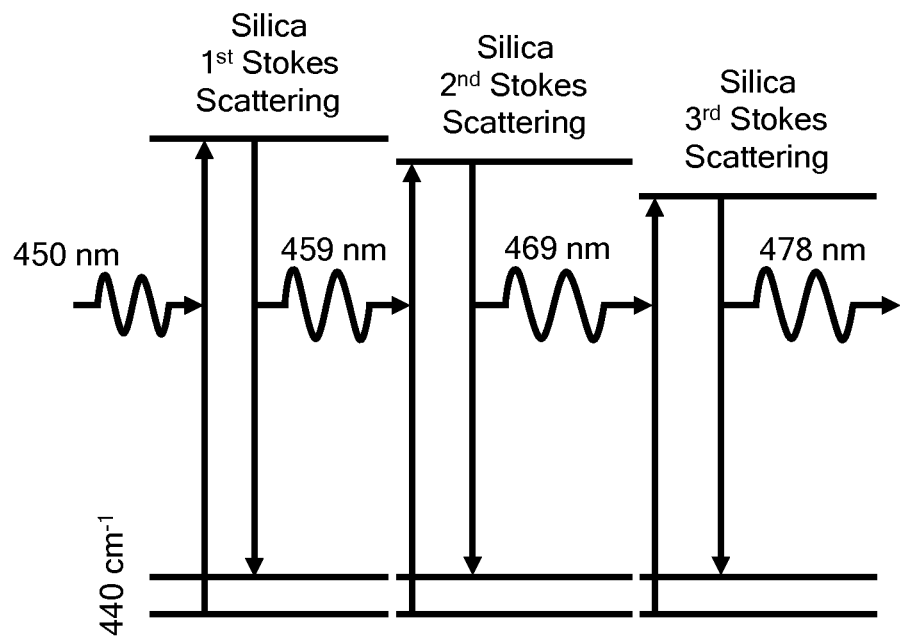

Turning to FIG. 13A there is shown the transitions that take place through three Raman orders, stokes, to provide a 478 nm functional laser beam from a 450 nm pump source.

Figure 13B:
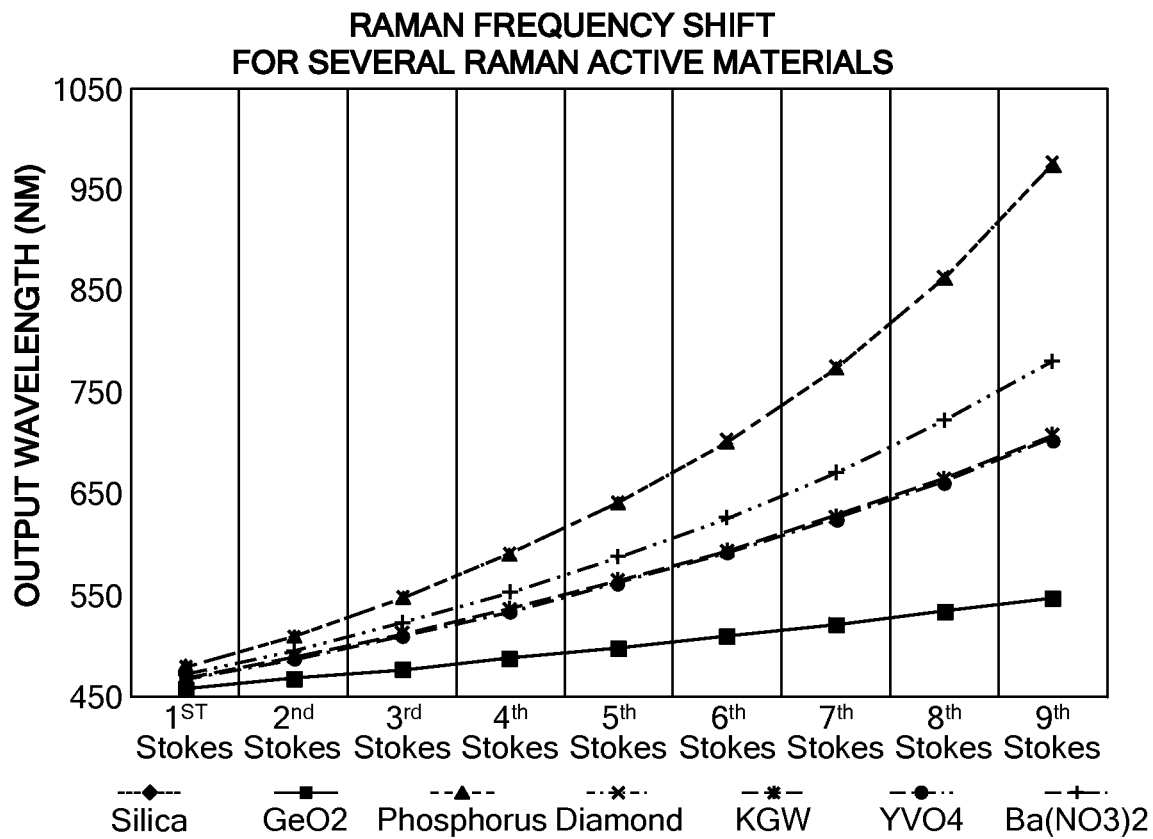

Examples of Raman fiber lasers, having different materials, and their respective wavelength outputs for n-order stokes shifts, when pumped with a 450 nm laser, are shown in FIGS. 13B & 13C. These fibers all have a 20 μm diameter core, and a 50 μm clad thickness.

Figure 14A:
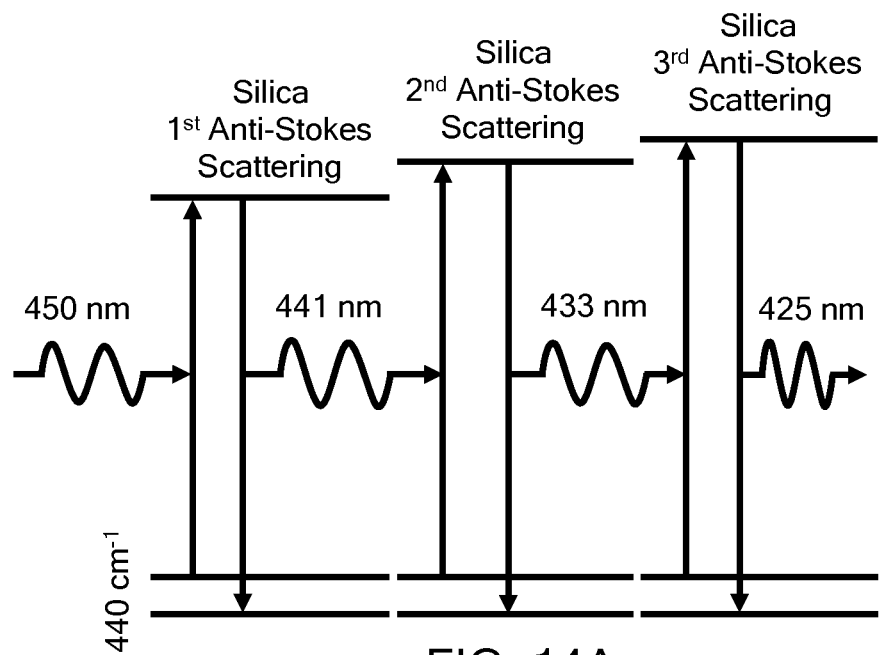

Turning to FIG. 14A there is shown the transitions that take place through three Raman orders, anti-stokes, to provide a 425 nm functional laser beam from a 450 nm pump source.

Figure 14B:
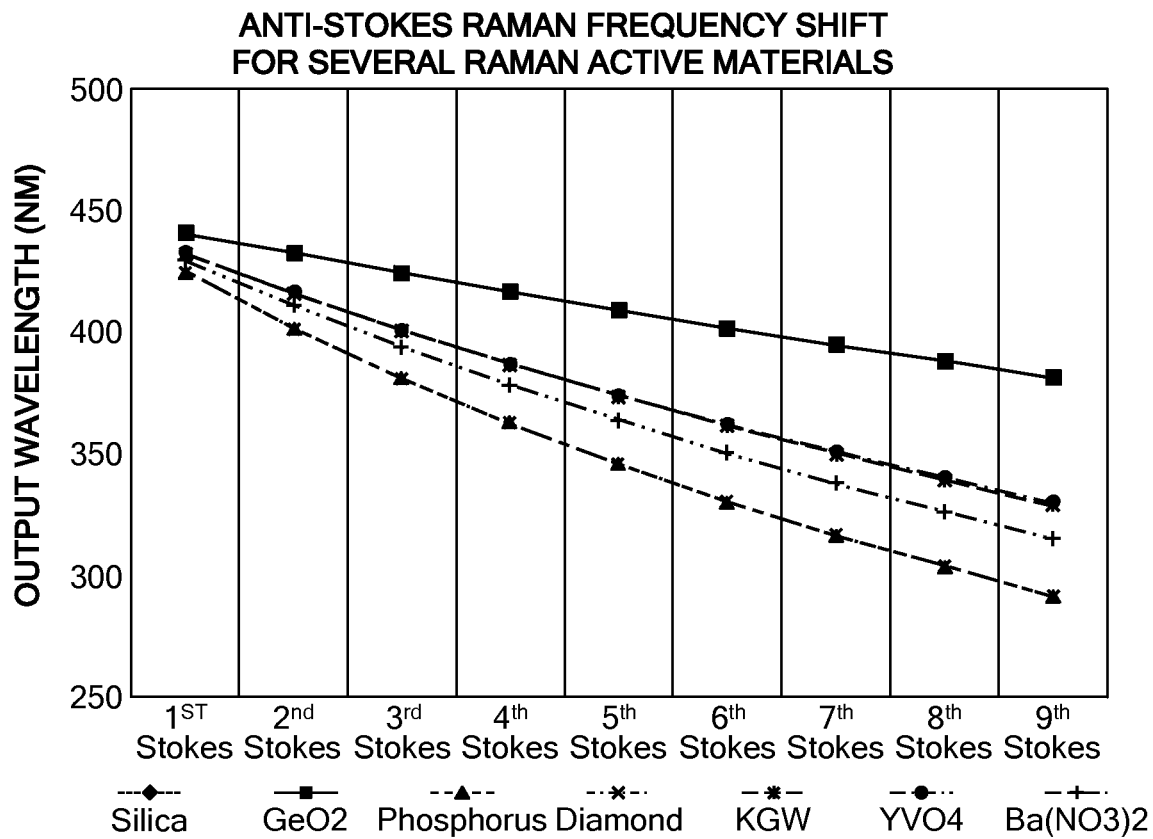

Examples of Raman fiber lasers, having different materials, and their respective wavelength outputs for n-order stokes shifts, when pumped with a 450 nm laser, are shown in FIGS. 14B & 14C. These fibers all have a 20 μm diameter core, and a 50 μm clad thickness.

Figure 15:
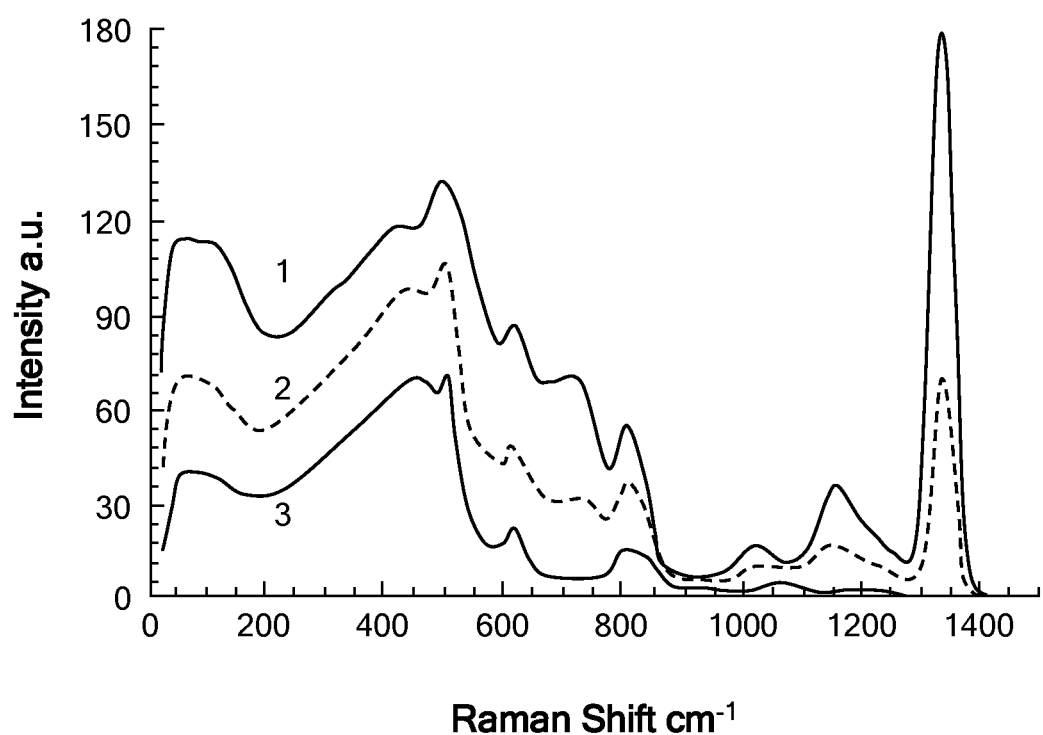
FIG. 15 is the Raman spectra in an embodiment of a phosphosilicate fiber for three different dopant levels for use in accordance with the present inventions.

Turning to FIG. 15 there is shown the Raman spectra in a phosphosilicate doped fiber. $P_2O_5$ concentrations of in the fiber are:18 mol %, line 1; 7 mol %, line 2; and for fused silica fiber with no $P_2O_5$ (e.g., 0 nik %), line 3. Thus, laser emission can be achieved over a wide range of frequencies from a few $cm^{-1}$ to 1330 $cm^{-1}$.

The following examples are provided to illustrate various embodiments of LAM systems, LAM methods, and Raman oscillator lasers of the present inventions. These examples are for illustrative purposes and should not be viewed as, and do not otherwise limit the scope of the present inventions.

EXAMPLE 1

A Raman Laser Module (RLM) has a forward pump Raman Standard Laser Module as the pump laser to a Raman laser oscillator fiber to provide a 200 W, $M^2$ of about 1, 460 nm laser beam that can be modulated up to 2 MHz for various and predetermined manufacturing applications. The pump Standard Laser Module (SLM) provides a 200 W, 10 mm-mrad, ~450 nm laser beam to be used as a forward pump for the laser oscillator fiber. The oscillator fiber has a 60-100 μm clad, a 10-50 μm core and provides a 200 W Output, <0.3 mm-mrad, ~460 nm laser beam.

EXAMPLE 2

Five RLMs of Example 1 are in the additive manufacturing system of FIG. 5. Their beams are combined to form a single 1 kW functional laser beam. The embodiment of this example can be used to print, e.g., build or make, metal based articles.

EXAMPLE 3

Five RLMs of Example 1 are in the additive manufacturing system of FIG. 6. Their beams are combined to form a single 1 kW functional laser beam. The embodiment of this example can be used to print, e.g., build or make, metal based articles.

EXAMPLE 4

Seven RLMs of Example 1 are in the 3-D printer of FIG. 5. Their beams are combined to form a single 1.4 kW functional laser beam. The embodiment of this example can be used to print, e.g., build or make, metal based articles.

EXAMPLE 5

Ten RLMs of Example 1 are in the additive manufacturing system of FIG. 6. Their beams are combined to form a single 2 kW functional laser beam. The embodiment of this example can be used to print, e.g., build or make, metal based articles.

EXAMPLE 6

A Raman Laser Module (RLM) has a backward pump Raman Standard Laser Module as the pump laser to a Raman laser oscillator fiber to provide a 200 W, $M^2$ of about 460 nm laser beam that can be modulated up to 2 MHz for various and predetermined manufacturing applications. The pump Standard Laser Module (SLM) provides a 200 W, 10 mm-mrad, ~450 nm laser beam to be used as a backward pump for the laser oscillator fiber. The oscillator fiber has a 60-100 μm clad, a 10-50 μm core and provides a 200 W Output, <0.3 mm-mrad, ~460 nm laser beam.

EXAMPLE 7

Five RLMs of Example 6 are in the additive manufacturing system of FIG. 5. Their beams are combined to form a single 1 kW functional laser beam. The embodiment of this example can be used to print, e.g., build or make, metal based articles.

EXAMPLE 8

Eight RLMs of Example 6 are in the additive manufacturing system of FIG. 6. Their beams are combined to form a single 1.6 kW functional laser beam. The embodiment of this example can be used to print, e.g., build or make, metal based articles.

EXAMPLE 9

One RLM of Example 6 is in the additive manufacturing system of FIG. 5. The LRM provides a single 0.2 kW functional laser beam. The embodiment of this example can be used to print, e.g., build or make, metal based articles.

EXAMPLE 10

A high power Raman Laser pumped by high brightness blue laser diodes with >1 Watt output power at any n-Raman orders from the originating pump wavelength.

EXAMPLE 11

The use of the laser of Example 10 for material processing applications such as welding, cutting, heat treating, brazing and surface modification.

EXAMPLE 12

A high power blue laser diode system (405 nm-475 nm) that can launch >100 Watts into a >50 μm fiber.

EXAMPLE 13

A high power blue laser diode system with >5 mm-mrad beam parameter product to pump a Raman fiber laser.

EXAMPLE 14

A high power blue laser diode system with >10 mm-mrad beam parameter product to pump a Raman fiber laser.

EXAMPLE 15

A high power blue laser diode system pumping an n-Raman order fiber laser to achieve any visible wavelength.

EXAMPLE 16

A high power blue laser diode system pumping a Raman fiber laser with outputs on all n-orders, where n>0.

EXAMPLE 17

A high power Raman laser system with $2>M^2>1$ beam quality.

EXAMPLE 18

A high power Raman laser system with >1 Watts operating at 410-500 nm that can be used for processing materials.

EXAMPLE 19

A high power blue Raman laser system with >1000 Watts for cutting, welding, brazing, polishing and marking materials.

EXAMPLE 20

A high power blue Raman laser system >10 Watts with a high power diode pump system that is modular in design.

EXAMPLE 21

A high power blue Raman laser system >10 Watts that has an air cooled blue diode laser pump.

EXAMPLE 22

A high power blue diode laser system that is spectrally beam combined to produce a <10 nm composite beam that can be used to pump a high power Raman laser system.

EXAMPLE 23

A high power blue Raman laser system >10 Watts that is spectrally beam combined to produce a composite beam with a low $M^2$ value, e.g., less than 2.5, less than 2.0, less than 1.8, and less 1.5, and less than 1.2.

EXAMPLE 24

A high power blue Raman laser and amplifier system >10 Watts that is coherently combined to produce a very high power diffraction limited beam.

EXAMPLE 25

A high power blue diode laser system of Example 23 that uses a prism to spectrally beam combine.

EXAMPLE 26

A high power blue diode laser Raman laser pump of Example 23 that uses a diffractive element to spectrally beam combine.

EXAMPLE 27

A high power blue diode laser Raman laser pump of Example 23 that uses a volume Bragg grating to spectrally beam combine.

EXAMPLE 28

A high power blue Raman laser >10 Watts for combination with a digital mirror device for projecting a color image including 3-D capability.

EXAMPLE 29

A high power blue Raman laser with >10 Watts for entertainment purposes.

EXAMPLE 30

A high power blue Raman laser >10 Watts for pumping a phosphor for producing a white light source that can be used in projection systems, headlights, or illumination systems.

EXAMPLE 31

An array of high power blue laser diode modules locked to a narrow wavelength band by a volume bragg grating for pumping a Raman fiber laser system.

EXAMPLE 32

An array of high power blue laser diode modules locked to a narrow wavelength band by a fiber Bragg grating for pumping a Raman fiber laser system.

EXAMPLE 33

An array of high power blue laser diode modules locked to a narrow wavelength band by a transmissive grating for pumping a Raman fiber laser.

EXAMPLE 34

An array of high power blue laser diode modules locked to a range of wavelengths by a transmissive grating for pumping an n-order Raman laser.

EXAMPLE 35

An air cooled or water cooled heat exchanger attached to the backplane to dissipate the heat from the laser diode modules and a Raman Fiber laser.

EXAMPLE 36

A laser diode module with integral drive electronics to control the current and enable the rapid pulsing of the laser diode for pumping a Raman laser.

EXAMPLE 37

A high power Raman laser based on a convertor material such as Diamond where the Raman laser is pumped by a visible laser diode array that is mode matched to the Raman laser mode.

EXAMPLE 38

The use of the laser in Example 37 for material processing such as welding, cutting, brazing, heat treating, and surface modification.

EXAMPLE 39

The building speed of an embodiment of a UV laser (350 nm) of the present inventions is compared against the build speed of a prior art IR fiber laser (1070 nm). From the above Table IV, it can be seen that significantly greater build speeds are obtainable with embodiments of the present inventions.

EXAMPLE 40

The embodiments of Examples 1-8 can be combined with, or otherwise incorporated into a milling machine, such as a CNC machine, or laser, sonic, water jet, mechanical or other type of milling, machining or cutting apparatus. In this manner there is a Raman additive-subtractive manufacturing apparatus and process. In an embodiment the functional Raman laser beam can be used to build an article, which is then further machined, i.e., material is removed. The Raman laser beam can be used to add lost material to a worn article that is further machined. Other variations and combinations of adding, removing and adding material to reach a final product, part or article are contemplated. Thus, there is provided in one embodiment the removal of Raman laser beam added material. In a laser machining additive-subtractive apparatus and process, the laser used for removal (e.g., subtractive manufacturing, the cutting laser beam, the machining laser beam), can be a Raman generated beam, the LAM functional beam, or a separate beam having a different wavelength (e.g., IR, such as a wavelength >1,000 nm), the cutting laser beam and the functional laser beam (LAM beam) can follow essentially the same beam delivery paths, can follow substantially distinct beam delivery paths, and can share, some, all or none of the beam shaping and delivery optics, and combinations and variations of these.

EXAMPLE 41

The embodiments of Examples 1-8 have a table that is a longitudinally moving surface, or support structure, such as a belt, conveyor, or articulated and overlapping leafs, which allow for the making of continuous ribbon, rods, fiber, rope, wire, tubular, band or other elongate structures.

EXAMPLE 42

Figure 17:
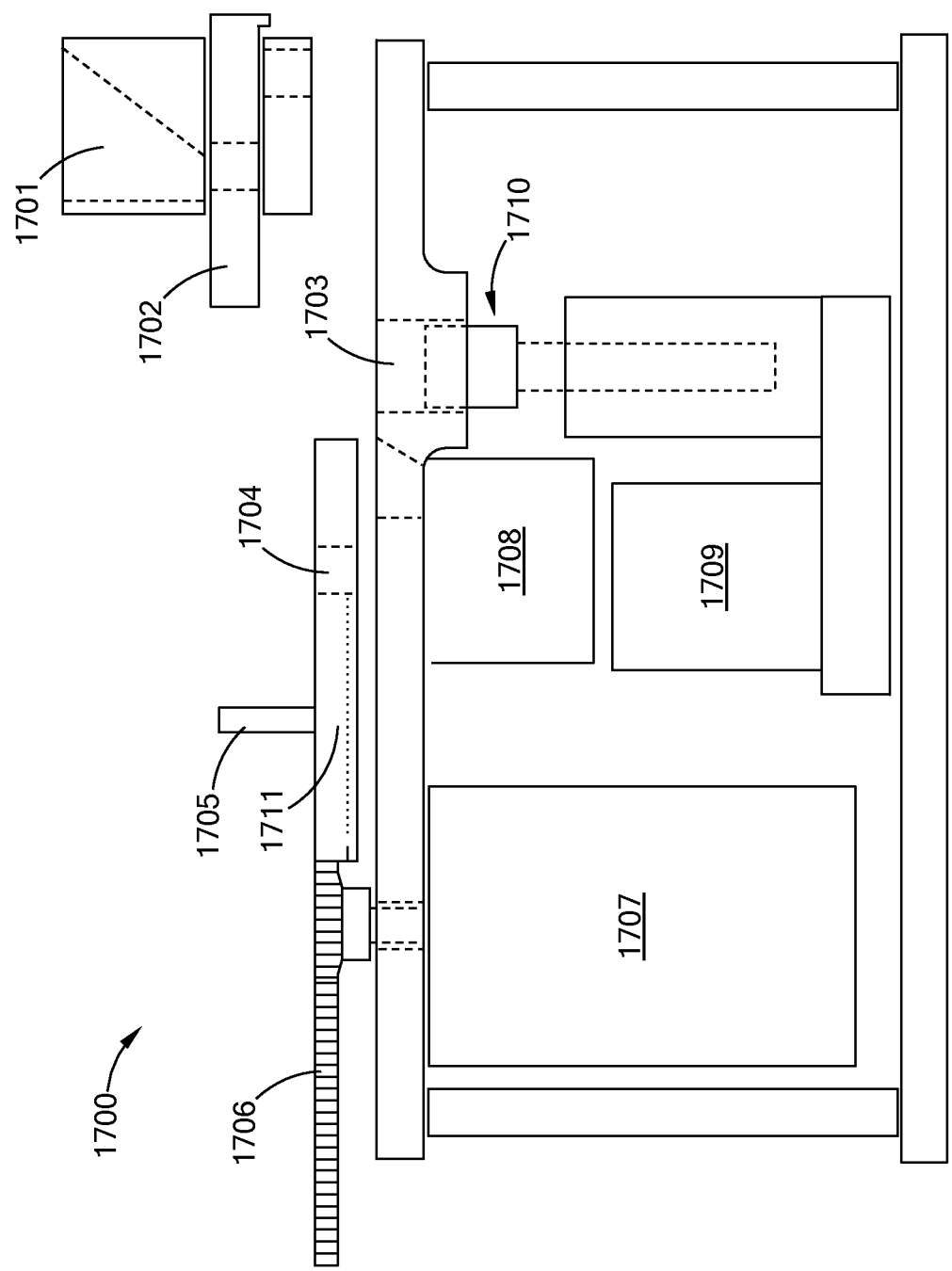
FIG. 17 is a schematic view of of an embodiment of a LAM system in accordance with the present inventions.

The embodiments of Examples 1 and 6 are used in the additive manufacturing system of FIG. 17. The system 1700 has a hopper 1701 for holding the starting material, an adjustable metering plate 1702 for delivering the starting material, a working station 1703, a transport chamber 1704, a metering plate actuator pin 1705, a shuttle 1711, a rack and pinion shuttle drive 1706, a shuttle stepper motor 1707, a waste bin 1708, an elevator stepper motor 1709, and an elevator 1710.

EXAMPLE 43

A LAM system is a galvo-scanned powder bed processes and system. The laser delivery apparatus has a collimator/beam expander for the laser beam and an X-Y galvo scanning system, and an F-Theta lens. The collimator/beam expander can be fixed ratio or variable depending on the build process, if a larger spot size is needed, then the beam expander ratio is decreased. Similarly if a smaller spot size on the part is needed, then the beam expander ratio is increased to create a larger diameter launch beam. The powder is placed with a starting material delivery system on the worktable and leveled with a leveling mechanism. In this embodiment, the motion of the table is only needed in the z axis. A variable focus lens in the laser beam path could also be utilized to accomplish z axis movement.

EXAMPLE 44

A high power blue laser diode system with >10 mm-mrad beam parameter product that can be used to weld, cut, braze, polish and mark materials such as metals, plastics and non-metal materials.

EXAMPLE 45

RLMs are coherently combined using either a master oscillator power amplifier configuration, or a Fourier transform external cavity. Examples of systems for coherent beam combining are disclosed and taught in U.S. Pat. No. 5,832,006, the entire disclosure of which is incorporated herein by reference.

It is noted that there is no requirement to provide or address the theory underlying the novel and groundbreaking processes, materials, performance or other beneficial features and properties that are the subject of, or associated with, embodiments of the present inventions. Nevertheless, various theories are provided in this specification to further advance the art in this area. The theories put forth in this specification, and unless expressly stated otherwise, in no way limit, restrict or narrow the scope of protection to be afforded the claimed inventions. These theories many not be required or practiced to utilize the present inventions. It is further understood that the present inventions may lead to new, and heretofore unknown theories to explain the function-features of embodiments of the methods, articles, materials, devices and system of the present inventions; and such later developed theories shall not limit the scope of protection afforded the present inventions.

The various embodiments of systems, equipment, techniques, methods, activities and operations set forth in this specification may be used for various other activities and in other fields in addition to those set forth herein. Additionally, these embodiments, for example, may be used with: other equipment or activities that may be developed in the future; and with existing equipment or activities which may be modified, in-part, based on the teachings of this specification. Further, the various embodiments set forth in this specification may be used with each other in different and various combinations. Thus, for example, the configurations provided in the various embodiments of this specification may be used with each other; and the scope of protection afforded the present inventions should not be limited to a particular embodiment, configuration or arrangement that is set forth in a particular embodiment, example, or in an embodiment in a particular Figure.

The invention may be embodied in other forms than those specifically disclosed herein without departing from its spirit or essential characteristics. The described embodiments are to be considered in all respects only as illustrative and not restrictive.

What is claimed:

1. A laser additive manufacturing (LAM) apparatus comprising:
 a. a laser for providing a functional laser beam along a beam path, the functional laser beam having a wavelength less than about 750 nm;
 b. a build table;
 c. a starting material, and a starting material delivery apparatus, wherein the starting material can be delivered to a target area adjacent the build table;
 d. a laser beam delivery apparatus, comprising a beam shaping optic to form a laser beam spot;
 e. a motor and positioning apparatus, mechanically connected to the build table, the laser beam delivery apparatus, or both; whereby the motor and positioning apparatus are capable of providing relative movement between the laser beam delivery apparatus and the build table;
 f. a control system, the control system comprising a processor, a memory device and a LAM plan wherein the LAM plan is in the memory device, wherein the control system is capable of implementing the LAM plan through the predetermined placement of the functional laser beam and the starting material; and, g. wherein the laser comprises a pump laser diode and a Raman oscillator that are configured to provide an n-order Raman oscillation, where n is an integer.

2. The apparatus of claim 1, wherein n is selected from the group consisting of 2, 3, 4, 5, and 6.

3. The apparatus of claim 2, wherein the build material is selected from the group consisting of Magnesium, Aluminum, Gallium, Tin, Lead, Titanium, Vanadium, Chromium, Manganese, Iron, Cobalt, Nickel, Copper, Zinc, Zirconium, Molybdenum, Rhodium, Palladium, Silver, Cadmium, Tungsten, Gold, Mercury, metals, alloys of metals, and mixtures of metals.

4. The apparatus of claim 3, wherein the starting material is a powder having a particle size from about 0.05 μm to about 2.5 μm.

5. The apparatus of claim 1, wherein the n-order oscillation is stokes.

6. The apparatus of claim 1, wherein the n-order oscillation is anti-stokes.

7. The apparatus of claim 1, wherein the build material is selected from the group consisting of Magnesium, Aluminum, Gallium, Tin, Lead, Titanium, Vanadium, Chromium, Manganese, Iron, Cobalt, Nickel, Copper, Zinc, Zirconium, Molybdenum, Rhodium, Palladium, Silver, Cadmium, Tungsten, Gold, Mercury, metals, alloys of metals, and mixtures of metals.

8. The apparatus of claim 7, wherein the starting material is a powder having a particle size less than about 25 μm.

9. The apparatus of claim 7, wherein the starting material is a powder having a particle size less than about 15 μm.

10. The apparatus of claim 7, wherein the starting material is a powder having a particle size less than about 0.5 μm.

11. The apparatus of claim 1, wherein the starting material is a powder.

12. The apparatus of claim 1, wherein the starting material is a powder having a particle size less than about 1 μm.

13. The apparatus of claim 1, wherein the starting material is a powder having a particle size from about 0.05 μm to about 2.5 μm.

14. The apparatus of claim 1, wherein the starting material is a powder having a particle size from about 40 μm and smaller.

15. A Raman laser modules (RLM) for use in laser additive manufacturing, the RLM comprising: a pump laser beam source and a Raman oscillator for providing a functional laser beam; the functional laser beam having a wavelength less than about 700 nm, a $M^2$ of less than 2, and a power of greater than 500 W.

16. The apparatus of claim 15, wherein the pump laser source comprises a plurality of laser diodes to produce a pump laser beam having a beam parameter product from about 9 to about 14 mm-mrad.

17. The apparatus of claim 15, wherein the Raman oscillator comprises a crystal oscillator comprising material selected from the group consisting of Diamond, KGW, $YVO_4$, and $Ba(NO_3)_2$.

18. The apparatus of claim 15, wherein the Raman oscillator comprises a fiber oscillator comprising a material selected from the group consisting of Silica, $GeO_2$ doped silica, Phosphorus doped silica.

19. The apparatus of claim 18, wherein the oscillator fiber has a length and the length is about 20 m or less.

20. The apparatus of claim 18, wherein the functional laser beam has a wavelength of from about 405 nm to about 470 nm.

21. The apparatus of claim 15, wherein the pump laser source comprises a diode laser.

22. The apparatus of claim 15, wherein the pump laser source comprises a plurality of laser diodes to produce a pump laser beam having a beam parameter product of less than about 10 mm-mrad.

23. The apparatus of claim 22, wherein the oscillator fiber has a length and the length is about 25 m or less.

24. The apparatus of claim 15, wherein the pump laser source comprises an array of at least 20 blue laser diodes.

25. The apparatus of claim 24, wherein the array provides a pump laser beam having a wavelength in the range of about 405 nm to about 460 nm.

26. The apparatus of claim 25, wherein the oscillator fiber has a length and the length is about 20 m or less.

27. The apparatus of claim 25, wherein the functional laser beam has a wavelength of from about 405 nm to about 470 nm.

28. The apparatus of claim 15, wherein the oscillator fiber has a length and the length is about 30 m or less.

29. The apparatus of claim 15, wherein the functional laser beam has a wavelength of from about 405 nm to about 470 nm.

30. The apparatus of claim 15, wherein the pump laser source comprises a blue laser diode system, the system providing a pump laser beam having a wavelength of about 405 nm-475 nm, a power of greater than 100 W; and wherein the Raman oscillator fiber has a core diameter of about 10 μm-50 μm and is a graded index fiber.

31. The system of claim 15, wherein the pump laser source is cooled, and the cooling is selected from the group consisting of air cooled, liquid cooled and water cooled.

32. The system of claim 15, wherein the pump laser source comprises a spectral beam combiner.

33. A system comprising a plurality of the RLMs of claim 15, wherein laser beams from the RLMs are coherently combined to form a single functional laser beam.

34. The system of claim 15, wherein the pump laser source comprises a laser diode and integral drive electronics to control the current and enable the rapid pulsing of the pump laser source diode to provide a pulsed pump laser beam.

35. The system of claim 34, wherein the pulse rate to from about 0.1 MHz to about 10 MHz.

36. The apparatus of claim 15, wherein the Raman oscillator comprises a high pressure gas.

37. The apparatus of claim 15, wherein the pump laser source comprises a plurality of laser diodes to produce a pump laser beam having a beam parameter product of less than about 14 mm-mrad.

38. A 3-D printing apparatus comprising a starting material delivery apparatus, wherein a starting material can be delivered to a target area adjacent a predetermined build area; a beam shaping optic to provide a functional laser beam spot having a cross section of less than about 100 microns at the build area; and a Raman laser module (RLM).

39. The 3-D printing apparatus of claim 38, wherein the RLM comprises: a pump laser beam source and a Raman oscillator; the functional laser beam having a wavelength less than about 700 nm, a $M^2$ of less than 2, and a power of greater than 500 W.

40. The 3-D printing apparatus of claim 39, wherein the functional laser beam has a wavelength of from about 405 nm to about 470 nm.

41. The 3-D printing apparatus of claim 39, wherein the functional laser beam has a wavelength in the 500s nm range.

42. The 3-D printing apparatus of claim 39, wherein the Raman oscillator comprises a fiber oscillator comprising a material selected from the group consisting of Silica, GeO$_2$ doped silica, Phosphorus doped silica.

43. The 3-D printing apparatus of claim 39, wherein the pump laser source comprises an array of at least 20 blue laser diodes.

44. The 3-D printing apparatus of claim 43, wherein the array provides a pump laser beam having a wavelength in the range of about 405 nm to about 460 nm.

* * * * *